(12) United States Patent
Ishizuka et al.

(10) Patent No.: US 6,594,598 B1
(45) Date of Patent: Jul. 15, 2003

(54) METHOD FOR CONTROLLING PRODUCTION LINE

(75) Inventors: Hiroaki Ishizuka; Kyoji Yamashita, both of Kyoto (JP)

(73) Assignee: Matsushita Electronics Corporation, Osaka (JP)

( * ) Notice: Subject to any disclaimer, the term of this patent is extended or adjusted under 35 U.S.C. 154(b) by 0 days.

(21) Appl. No.: 09/166,904

(22) Filed: Oct. 6, 1998

(30) Foreign Application Priority Data

Oct. 8, 1997 (JP) .............................. 9-275434

(51) Int. Cl.⁷ .............................................. G06F 19/00
(52) U.S. Cl. ......................................... 702/84; 700/109
(58) Field of Search ............................ 700/51, 95, 108, 700/109, 121; 702/81, 82, 84

(56) References Cited

U.S. PATENT DOCUMENTS

| | | | |
|---|---|---|---|
| 4,901,242 A | | 2/1990 | Kotan |
| 5,442,561 A | * | 8/1995 | Yoshizawa et al. .......... 364/468 |
| 5,479,361 A | * | 12/1995 | Kurtzberg et al. ........... 364/552 |
| 5,635,850 A | * | 6/1997 | Ogura ......................... 324/760 |
| 5,655,110 A | * | 8/1997 | Krivokapic et al. ......... 395/500 |
| 5,665,609 A | * | 9/1997 | Mori .......................... 324/765 |
| 5,818,716 A | * | 10/1998 | Chin et al. .................. 700/100 |
| 5,841,659 A | * | 11/1998 | Tanaka et al. ............... 364/468 |
| 5,866,437 A | * | 2/1999 | Chen et al. .................. 438/14 |
| 5,923,553 A | * | 7/1999 | Yi ......................... 364/468.17 |
| 5,930,138 A | * | 7/1999 | Lin et al. ................. 364/468.15 |
| 5,943,237 A | * | 8/1999 | Van Boxem ............. 364/468.15 |
| 5,963,881 A | * | 10/1999 | Kahn et al. .................... 702/35 |
| 5,971,585 A | * | 10/1999 | Dangat et al. .......... 364/468.08 |
| 6,028,994 A | * | 2/2000 | Peng et al. .................... 703/15 |
| 6,041,270 A | * | 3/2000 | Steffan et al. ............... 700/121 |
| 6,055,463 A | * | 4/2000 | Cheong et al. ............. 700/223 |
| 6,061,640 A | * | 5/2000 | Tanaka et al. .............. 700/108 |
| 6,090,632 A | * | 7/2000 | Jeon et al. ................... 324/765 |
| 6,098,024 A | * | 8/2000 | Chen et al. .................... 702/81 |
| 6,112,130 A | * | 8/2000 | Fukuda et al. .............. 700/121 |
| 6,154,711 A | * | 11/2000 | Steffan et al. ................ 702/82 |
| 6,174,738 B1 | * | 1/2001 | Steffan et al. ................. 438/5 |

FOREIGN PATENT DOCUMENTS

| | | |
|---|---|---|
| JP | 63-249328 | 10/1988 |
| JP | 3-221358 | 9/1991 |
| JP | 05-135068 | 6/1993 |
| JP | 07-302826 | 11/1995 |
| JP | 09-219347 | 8/1997 |

OTHER PUBLICATIONS

Mozumder et al., "Statistical Control of VLSI Fabrication Processes", IEEE, Feb. 1990.*

K. Aoyama et al., "Rigorous Statistical Process Variation Analysis for Quarter–$\mu m$ CMOS with Advanced TCAD Metrology", (1997 2nd International Workshop on Statistical Metrology, pp. 8–11, Jun., 1997).

K. Nakata et al., "A New Method for Predicting Anomalous Variation of Factors Affecting on ULSI Yield" (International Symposium on Semiconductor Manufacturing '96, pp. 297–300, Oct., 1996).

* cited by examiner

*Primary Examiner*—Patrick Assouad
(74) *Attorney, Agent, or Firm*—Nixon Peabody LLP; Donald R. Studebaker

(57) ABSTRACT

In a production line for obtaining a final product by performing a plurality of process steps on each of a plurality of products, when one of the process steps is finished, measured data is obtained by measuring the characteristics of a product on which the process step has been performed. Based on the measured data obtained, the performance of a final product is expected. And based on the expected performance of the final product, the number of products estimatingly finished for each performance rank thereof is calculated.

13 Claims, 18 Drawing Sheets

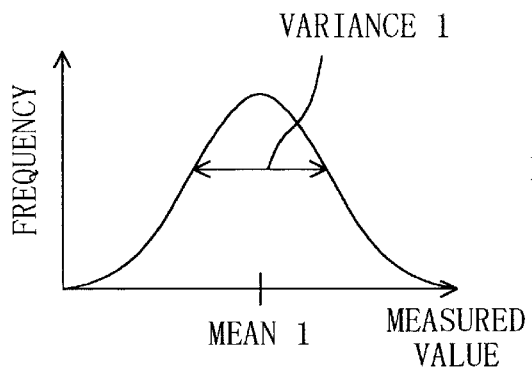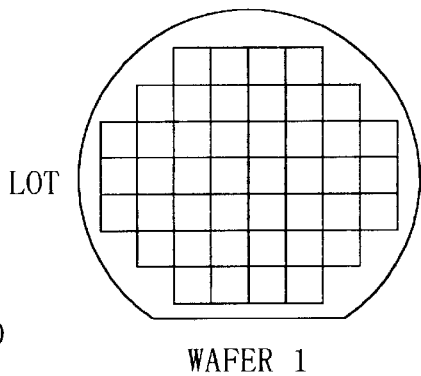
Fig. 3(a)
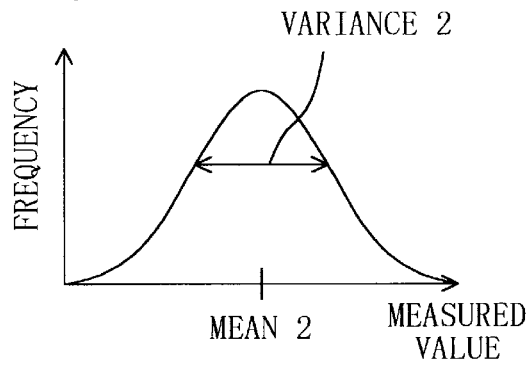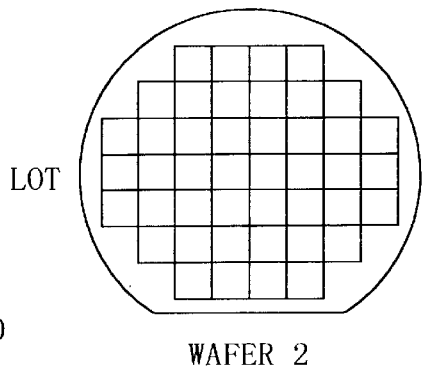
Fig. 3(b)
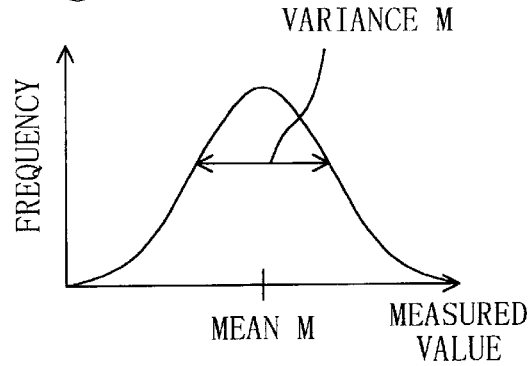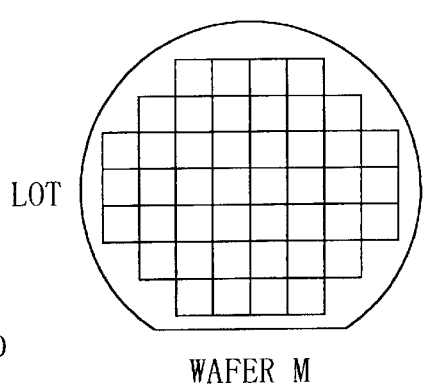
Fig. 3(c)

Fig. 5
MEASURED DATA(1, 1)···MEASURED DATA(i, 1)、
EXPECTED DATA(i+1, 1)···EXPECTED DATA(N, 1)
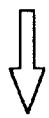
PERFORMANCE EXPECTATION FUNCTION
A=f(PARAMETER 1、PARAMETER 2、···PARAMETER N)
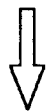
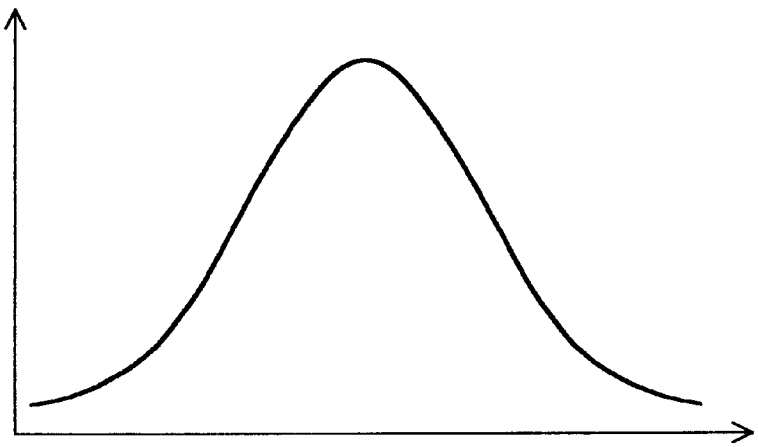

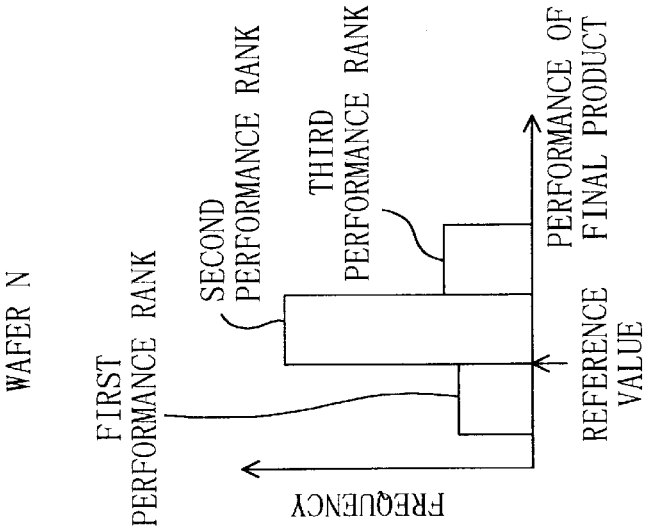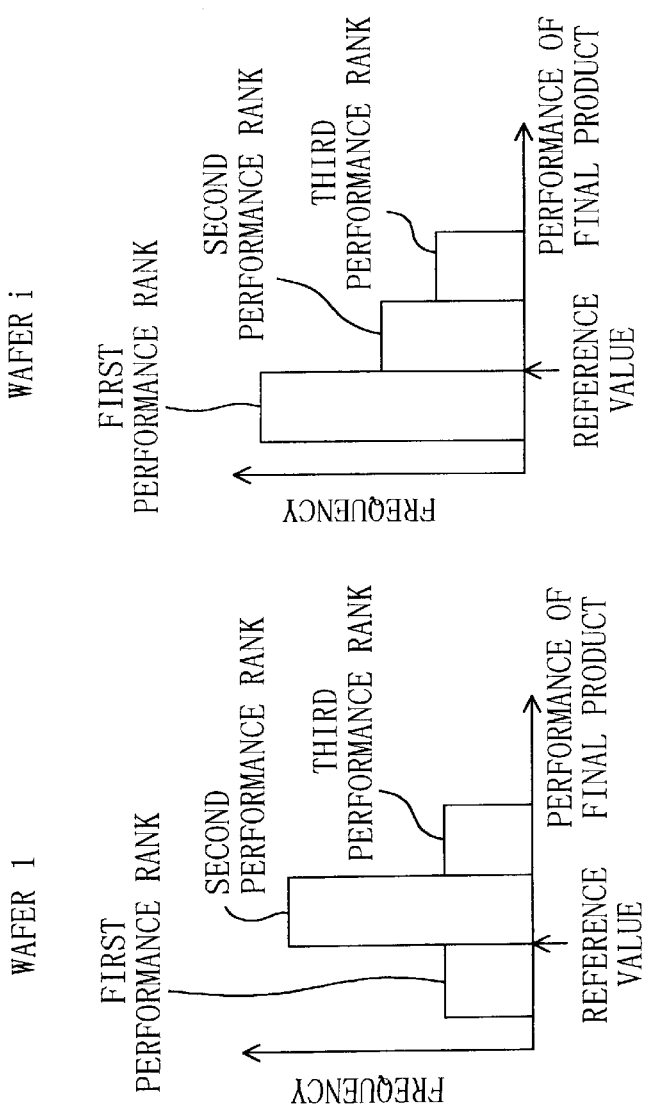

METHOD FOR CONTROLLING PRODUCTION LINE

BACKGROUND OF THE INVENTION

The present invention relates to a method and apparatus for controlling a production line, in which a final product is obtained by performing a plurality of process steps on at least one product. The present invention also relates to a computer readable storage medium in which a production line control program is stored.

Examples of the production line for obtaining a final product by performing a plurality of process steps on at least one product include a semiconductor device production line. In a semiconductor device production line, a semiconductor device is obtained as a final product by sequentially performing a plurality of process steps on a wafer in which a plurality of semiconductor chips are formed. The production line herein includes both a mass-production line and a development line.

The operating frequency of a semiconductor device as a final product is one of the known parameters representing the performance required for the semiconductor device. The value of a semiconductor device greatly depends on the performance (e.g., the operating frequency, in particular) thereof. Accordingly, the higher the operating frequency of a semiconductor device, the more valuable the device will be. And in order to produce a semiconductor device having a high operating frequency, a new semiconductor process enabling the reduction of a minimum process size should be introduced.

As a result of a semiconductor device production line, some of the semiconductor devices belonging to a single lot might have IC wiring patterns of sizes exceeding the tolerance range of other semiconductor devices belonging to the lot. Also, a semiconductor device belonging to a lot might have an IC wiring pattern of a much different size than that of a semiconductor device belonging to another lot. Such variation in the sizes of wiring patterns seriously affects the operating frequencies of semiconductor devices. For example, variation in the gate lengths of gate electrodes of transistors considerably affects the operating frequencies of the semiconductor devices including the transistors.

Thus, in accordance with a conventional method for controlling a semiconductor device production line, every time a single process step for a single lot is finished, the sizes of the wiring patterns for semiconductor integrated circuits included in the lot are measured. If any of the measured sizes of the wiring patterns is out of a predetermined range, a wafer including devices of such a size or a lot including such a wafer is removed from the production line. In addition, the processing conditions for the process step, during which devices of such an undesired size are formed, are also re-examined, thereby performing a feedback control.

Moreover, after all of the process steps on a semiconductor chip are finished, the semiconductor device is tested as a final product to determine whether or not the semiconductor device operates normally, at what megahertz the semiconductor device operates and so on. And based on the results of these tests on products, the price of each semiconductor device is set according to the rank of the operating frequency of the semiconductor device. Alternatively, if there are any semiconductor devices operating at too low a frequency to be valuable as a product, then such devices are thrown away as defective products.

However, it is now difficult to apply such a conventional control method to the production line of semiconductor devices belonging to a deep sub-micron generation. This is because the sizes of wiring patterns are different from each other to a far larger degree among semiconductor devices belonging to a single lot or between semiconductor devices belonging to mutually different lots. Under such circumstances, even semiconductor devices produced by a single production line might have mutually different operating frequencies.

If the operating frequencies of semiconductor devices are distributed in such a wide range, various inconveniences are caused in drawing up a project. For example, since it is difficult to precisely expect how many products can be produced and how valuable those product can be, it is hard to draw up a production plan. Also, if the operating frequency of a semiconductor device produced by a process of a brand new generation is at almost the same level as that of a semiconductor device produced by a process of a previous generation, the value of the new semiconductor device is lower than expected. In such a case, in spite of the implementation of a brand new process, the resulting product cannot be so valuable as to compensate for the investment.

SUMMARY OF THE INVENTION

In view of these problems, the present invention was made to (1) expect the number of products estimatingly finished for each performance rank of the final products before the products are finished, and (2) modify the performance of a resulting final product during a plurality of process steps performed on a product.

In order to accomplish these objects, a first method according to the present invention involves controlling a production line, in which a final product is obtained by performing a plurality of process steps on each of a plurality of products. The method includes the steps of: obtaining measured data by measuring the characteristics of a product at a time a particular one of the process steps, performed on the product, is finished; expecting the performance of a final product based on the measured data; and calculating a first number of products, estimatingly finished for each performance rank thereof, based on the performance of the final product expected in the step of expecting.

In accordance with the first production line control method, the performance of a final product is expected based on the measured data obtained by measuring the characteristics of a product at a time one of the process steps, performed on the product, is finished. And the number of products, estimatingly finished for each performance rank thereof, is calculated based on the expected performance of the final product. Accordingly, the number of final products can be expected for each performance rank thereof at a time a particular process step is finished. That is to say, before each product is finished, it is possible to expect the number of products capable of being produced and the cost of the products. As a result, a production plan can be drawn up more easily.

In one embodiment of the present invention, the step of expecting preferably includes the step of expecting the performance of the final product based on measured data obtained at a time another one of the process steps, performed prior to the particular process step, was finished and the measured data obtained at the time the particular process step is finished.

In such an embodiment, the performance of a final product can be expected more accurately. Accordingly, the number of final products can be expected more accurately for each performance rank.

In another embodiment of the present invention, the step of expecting preferably includes the step of expecting the performance of the final product based on measured data obtained at a time another one of the process steps was finished, performed prior to the particular process step, the measured data obtained at the time the particular process step is finished, and expected data estimatingly obtained at a time still another one of the process steps is finished, to be performed posterior to the particular process step.

In such an embodiment, the performance of a final product can be expected even more accurately. Accordingly, the number of final products can be expected even more accurately for each performance rank.

In still another embodiment of the present invention, the plurality of process steps are preferably performed on each of a plurality of lots, the plurality of products separately belonging to the respective lots. The method preferably farther includes the steps of: expecting a date of completion on which all of the process steps on the products belonging to one of the lots would be completed; obtaining a second number of products, estimatingly finished for each said performance rank by a due date, based on the date of completion and the first number; and if the second number runs short of a required number, performing the process steps on another one of the lots, which produces final products of the same performance rank as the products estimatingly finished by the due date, at a higher rate.

In such an embodiment, if the number of products estimatingly finished for each performance rank by a due date runs short of a required number, then the process steps on another lot, which can produce final products of the same performance rank as the products estimatingly finished by the due date, are performed at a higher rate. Accordingly, it is possible to reduce or eliminate the shortage in number of products finished for each performance rank by a due date.

In still another embodiment, the first method preferably further includes the steps of: expecting a date of completion on which all of the process steps on at least one of the products would be completed; obtaining a second number of products, estimatingly finished for each said performance rank by a due date, based on the date of completion and the first number; and if the second number runs short of a required number, introducing products into the production line to produce final products of the same performance rank as the products estimatingly finished by the due date.

In such an embodiment, if the number of products estimatingly finished for each performance rank by a due date runs short of a required number, then products are introduced into the production line to produce final products of the same performance rank as the products estimatingly finished by the due date. Accordingly, it is possible to reduce or eliminate the delay of production.

In still another embodiment, the first method preferably further includes the steps of: expecting a date of completion on which all of the process steps on at least one of the products would be completed; obtaining a second number of products, estimatingly finished for each said performance rank by a due date, based on the date of completion and the first number; and if the second number runs short of a required number, modifying processing conditions for the process steps to be performed on the at least one product posterior to the particular process step such that the performance of the final product is improved.

In such an embodiment, if the number of products estimatingly finished for each performance rank by a due date runs short of a required number, the number of final products of the same performance rank as that of the products estimatingly finished by the due date can be increased. Accordingly, it is possible to reduce or eliminate the shortage in number of products finished for each performance rank by a due date.

In still another embodiment, the first method preferably farther includes the steps of: expecting a date of completion on which all of the process steps on at least one of the products would be completed; obtaining a second number of products, estimatingly finished for each said performance rank by a due date, based on the date of completion and the first number; and if the second number runs short of a required number, additionally performing a new process step on the at least one product posterior to the particular process step such that the performance of the final product is improved.

In such an embodiment, if the number of products estimatingly finished for each performance rank by a due date runs short of a required number, the number of final products of the same performance rank as that of the products estimatingly finished by the due date can be increased. Accordingly, it is possible to reduce or eliminate the shortage in number of products finished for each performance rank by a due date.

In still another embodiment, the plurality of process steps are preferably performed on each of a plurality of lots, the plurality of products separately belonging to the respective lots. The first method preferably further includes the steps of: expecting a date of completion on which all of the process steps on the products belonging to one of the lots would be completed; obtaining a second number of products, estimatingly finished for each said performance rank by a due date, based on the date of completion and the first number; and if the second number is in excess of a required number, performing the process steps on another one of the lots, which produces final products of the same performance rank as the products estimatingly finished by the due date at a lower rate.

In such an embodiment, if the number of products estimatingly finished for each performance rank by a due date is in excess of a required number, the number of final products of the same performance rank as that of the products estimatingly finished by the due date can be reduced. Accordingly, it is possible to reduce or eliminate the excess in number of products finished for each performance rank by a due date. And it is also possible to finish products belonging to another rank on an earlier date.

In still another embodiment, the plurality of process steps are preferably performed on each of a plurality of lots, the plurality of products separately belonging to the respective lots. The first method preferably further includes the steps of: expecting a date of completion on which all of the process steps on the products belonging to one of the lots would be completed; obtaining a second number of products estimatingly finished for each said performance rank by a due date, based on the date of completion and the first number; and if the second number is in excess of a required number, stopping the process steps on another one of the lots, which produces final products of the same performance rank as the products estimatingly finished by the due date.

In such an embodiment, if the number of products estimatingly finished for each performance rank by a due date is in excess of a required number, the number of final products of the same performance rank as that of the products estimatingly finished by the due date can be reduced. Accordingly, it is possible to reduce or eliminate the excess in number of products finished for each performance rank by a due date. And it is also possible to finish products belonging to another rank on an earlier date.

In still another embodiment, the first method preferably farther includes the steps of: expecting a date of completion on which all of the process steps on at least one of the products would be completed; obtaining a second number of products estimatingly finished for each said performance rank by a due date based on the date of completion and the first number; and if the second number is in excess of a required number, omitting at least one of the process steps performed posterior to the particular process step.

In such an embodiment, if the number of products estimatingly finished for each performance rank by a due date is in excess of a required number, the number of final products of the same performance rank as that of the products estimatingly finished by the due date can be reduced. Accordingly, it is possible to reduce or eliminate the excess in number of products finished for each performance rank by a due date. And it is also possible to finish products belonging to another rank on an earlier date.

In still another embodiment, the plurality of process steps are preferably performed on each of a plurality of lots, the plurality of products separately belonging to the respective lots. The first method preferably further includes the steps of: obtaining estimated profit to be procured by each said lot based on the number of products estimatingly finished, production costs and selling price for each said performance rank of the final products; and performing the process steps on the products belonging to a lot for which the profit obtained is relatively high, at a higher rate.

In such an embodiment, the products, which are estimated to procure relatively high profit, can be finished earlier. Accordingly, it is possible to increase the profitability of a production line.

In still another embodiment, the first method preferably further includes the steps of: determining whether or not the performance of the final product expected in the step of expecting meets a predetermined standard; and removing products of which the final products are determined as not meeting the predetermined standard from the production line.

In such an embodiment, defective products not meeting a predetermined standard are not produced in vain.

In still another embodiment, the plurality of process steps are preferably performed on each of a plurality of lots, the plurality of products separately belonging to the respective lots. The first method further includes the step of transferring products belonging to one of the lots to another lot to which other products belong, the final products of which would be of approximately the same performance rank as that of the performance expected in the step of expecting.

In such an embodiment, the performance of final products can be averaged among the lots. Accordingly, the work of increasing/decreasing the number of final products having a particular performance can be easily done.

A second method according to the present invention involves controlling a production line in which a final product is obtained by performing a plurality of process steps on a product. The second method includes the steps of: obtaining measured data by measuring the characteristics of a product at a time a particular one of the process steps performed on the product is finished; comparing the measured data to a reference value of the characteristics of the product; and if the measured data is inferior to the reference value, modifying processing conditions for at least one of the process steps to be performed posterior to the particular process step such that the performance of the final product is improved.

In accordance with the second production line control method, measured data obtained by measuring the characteristics of a product, on which a particular process step has been performed, is compared to a reference value of the characteristics of the product. And if the measured data is inferior to the reference value, processing conditions for at least one process step to be performed posterior to the particular process step are modified such that the performance of a final product is improved. Accordingly, the performance of the final product can be superior to the performance expected at a time the particular process step is finished. As a result, it is possible to produce a larger number of final products having higher performance.

A third method according to the present invention involves controlling a production line in which a final product is obtained by performing a plurality of process steps on a product. The third method includes the steps of: obtaining measured data by measuring the characteristics of a product at a time a particular one of the process steps performed on the product is finished; comparing the measured data to a reference value of the characteristics of the product; and if the measured data is inferior to the reference value, adding a new process step posterior to the particular process step such that the performance of the final product is improved.

In accordance with the third production line control method, measured data obtained by measuring the characteristics of a product on which a particular process step has been performed is compared to a reference value of the characteristics of the product. And if the measured data is inferior to the reference value, a new process step is added such that the performance of the final product is improved. Accordingly, the performance of the final product can be superior to the performance expected at a time the particular process step is finished. As a result, it is possible to produce a larger number of final products having higher performance.

A fourth method according to the present invention involves controlling a production line in which a final product is obtained by performing a plurality of process steps on a product. The fourth method includes the steps of: obtaining measured data by measuring the characteristics of a product at a time a particular one of the process steps performed on the product is finished; comparing the measured data to a reference value of the characteristics of the product; and if the measured data is superior to the reference value, omitting at least one of the process steps to be performed posterior to the particular process step.

In accordance with the fourth production line control method, measured data obtained by measuring the characteristics of a product on which a particular process step has been performed is compared to a reference value of the characteristics of the product. And if the measured data is superior to the reference value, at least one process step to be performed posterior to the particular process step is omitted. Accordingly, the number of process steps can be reduced without deteriorating the performance of a final product from the initially expected performance. As a result, the final product can be produced earlier than initially scheduled.

BRIEF DESCRIPTION OF THE DRAWINGS

FIGS. 3(a) through 3(c) are graphs illustrating the measured data of respective wafers in each of which a plurality of semiconductor chips are formed in the production line control method of the first embodiment;

FIG. 5 is a drawing illustrating a method for expecting the performance of a final product based on the measured data and the expected data of a wafer when all the process steps on the wafer are finished in the production line control method of the first embodiment;

FIGS. 10(a) through 10(c) are graphs illustrating a fifth method for adjusting the progress of a production line in the production line control method of the first embodiment;

DESCRIPTION OF THE PREFERRED EMBODIMENTS

Embodiment 1

Hereinafter, method and apparatus for controlling a production line and a computer readable storage medium in which a production line control program is stored in the first embodiment of the present invention will be described with reference to FIGS. 1 through 9.

Figure 1:
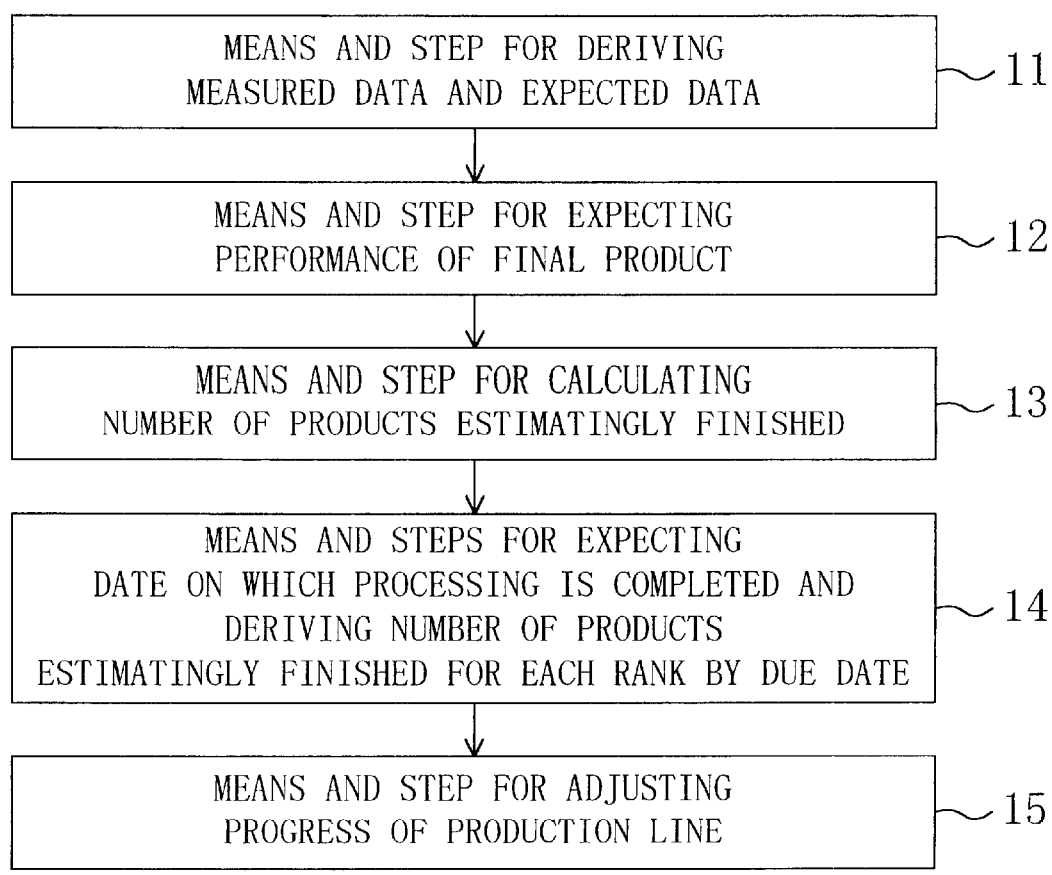
FIG. 1 is a conceptual diagram illustrating the flow of the method and apparatus for controlling a production line in the first embodiment of the present invention.

FIG. 1 is a conceptual diagram illustrating the flow of method and apparatus for controlling a production line of the first embodiment. As shown in FIG. 1, the production line control method and apparatus of the first embodiment includes: a means and step 11 for deriving measured data and expected data; a means and step 12 for expecting the performance of a final product; a means and step 13 for calculating the number of products estimatingly finished; a means and steps 14 for expecting a date on which processing would be completed and deriving the number of products estimatingly finished for each performance rank by a due date; and a means and step 15 for adjusting the progress of a production line. These means and steps 11 through 15 are implemented as respective procedures for a production line control program which are stored in a computer readable storage medium and executed by a computer.

Step of Deriving Measured Data and Expected Data

First, the process step 11 will be described. In this process step, measured data is derived as the characteristics of a product at a time a particular one of a plurality of process steps performed on the product is finished. And expected data is also derived as the characteristics of a product at a time another one of the process steps performed on the product posterior to the particular process step is finished.

Figure 2:
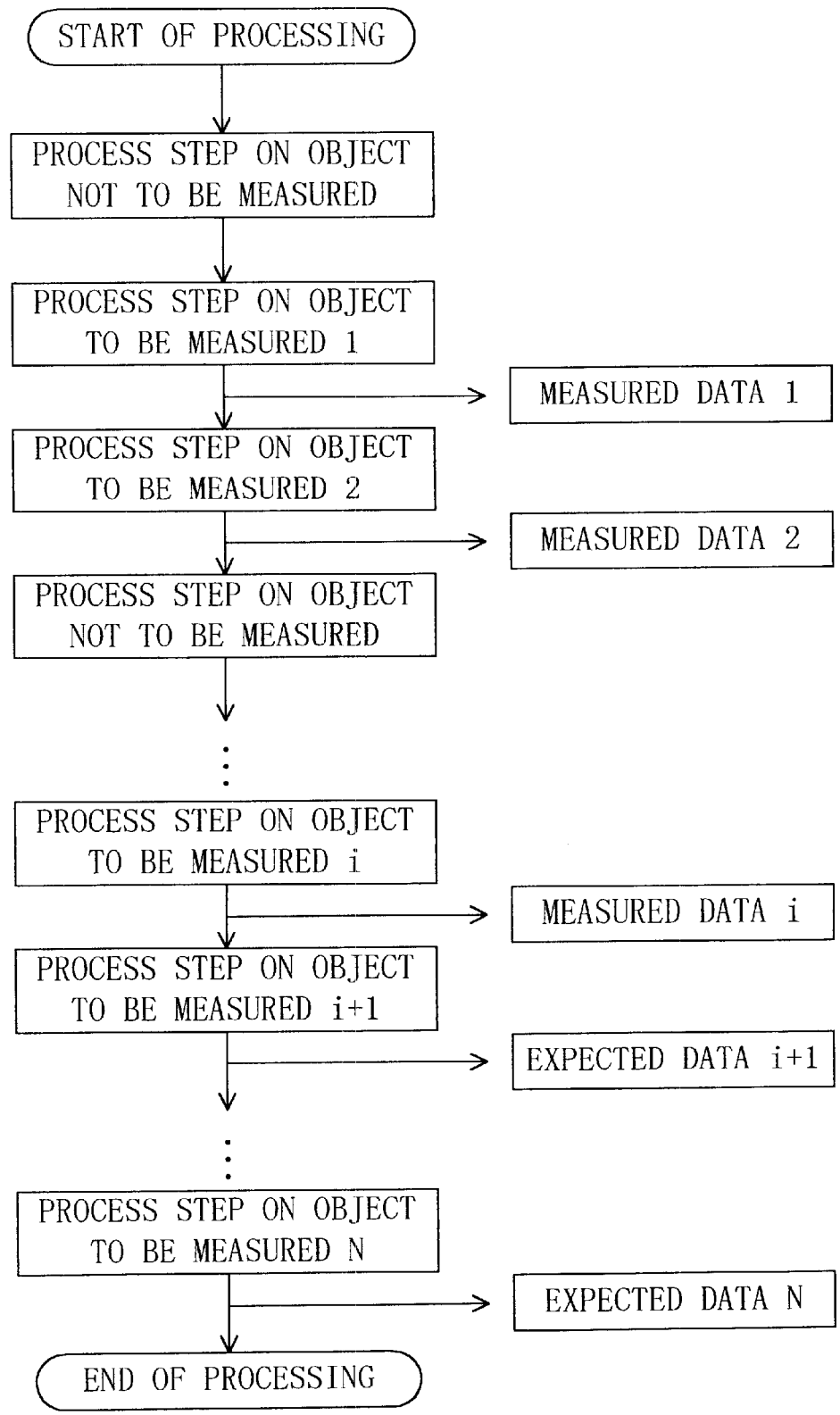
FIG. 2 is a flow chart illustrating a method for deriving measured data and expected data while performing a plurality of process steps on a plurality of products in the production line control method of the first embodiment.

FIG. 2 is a flow chart illustrating the processing flow of a production line for performing a plurality of process steps on each of a plurality of wafers. From each wafer, a plurality of semiconductor chips are obtained as a plurality of products. In general, the number of process steps in the production line of a semiconductor device is on the order of 300 to 500.

The plurality of process steps are classified into the two categories of: 1st, 2nd, . . . , i-th, (i+1)th, . . . , and N-th process steps on objects to be measured; and process steps on objects not to be measured. In each of the process step of the former type, measured data is derived by measuring the characteristics of a product at a time the process step is finished. This is because the characteristics of the product during the process step considerably affect the performance of a final product. On the other hand, in each of the process steps of the latter type, the characteristics of a product at a time the process step is finished are not measured (i.e., the measured data is not derived). This is because the characteristics of the product during the process step do not considerably affect the performance of a final product.

Typical examples of measured data and expected data derived in the production line of a semiconductor device include the gate length of a transistor, the thickness of an interlevel dielectric and the thickness of a metal interconnection. These measured data and expected data considerably affect the operating frequency of the semiconductor device.

At a point in time the i-th process step on an object to be measured is finished, the 1st, 2nd, . . . , (i-1)th and i-th measured data have been accumulated. Also, at this point in time, it is possible to derive the (i+1)th to the N-th expected data estimatingly obtained when subsequent process steps are respectively finished.

FIGS. 3(a) through 3(c) are graphs illustrating the measured data of respective wafers, in each of which a plurality of semiconductor chips are formed. In FIGS. 3(a) through 3(c), a single lot consists of a plurality of (e.g., a number H of) wafers. Even within a single wafer, the processing conditions on the wafer are not uniform on the entire plane thereof. Accordingly, the measured values (e.g., gate lengths of transistors, thicknesses of interlevel dielectric and thicknesses of metal interconnections) of respective semiconductor chips included in the single wafer have a variation. However, in general, the measured values have a variation represented as a normal distribution. Accordingly, even if the measured values are not derived for all the semiconductor chips included in a single wafer, the distribution of measured values can be represented by measured data defined by the mean and the variance (3σ) thereof. And because of the same reason, the distribution of measured values of semiconductor chips included in at least one wafer belonging to a single lot can also be represented by the measured data defined by the mean and variance of the measured values.

Figure 4:
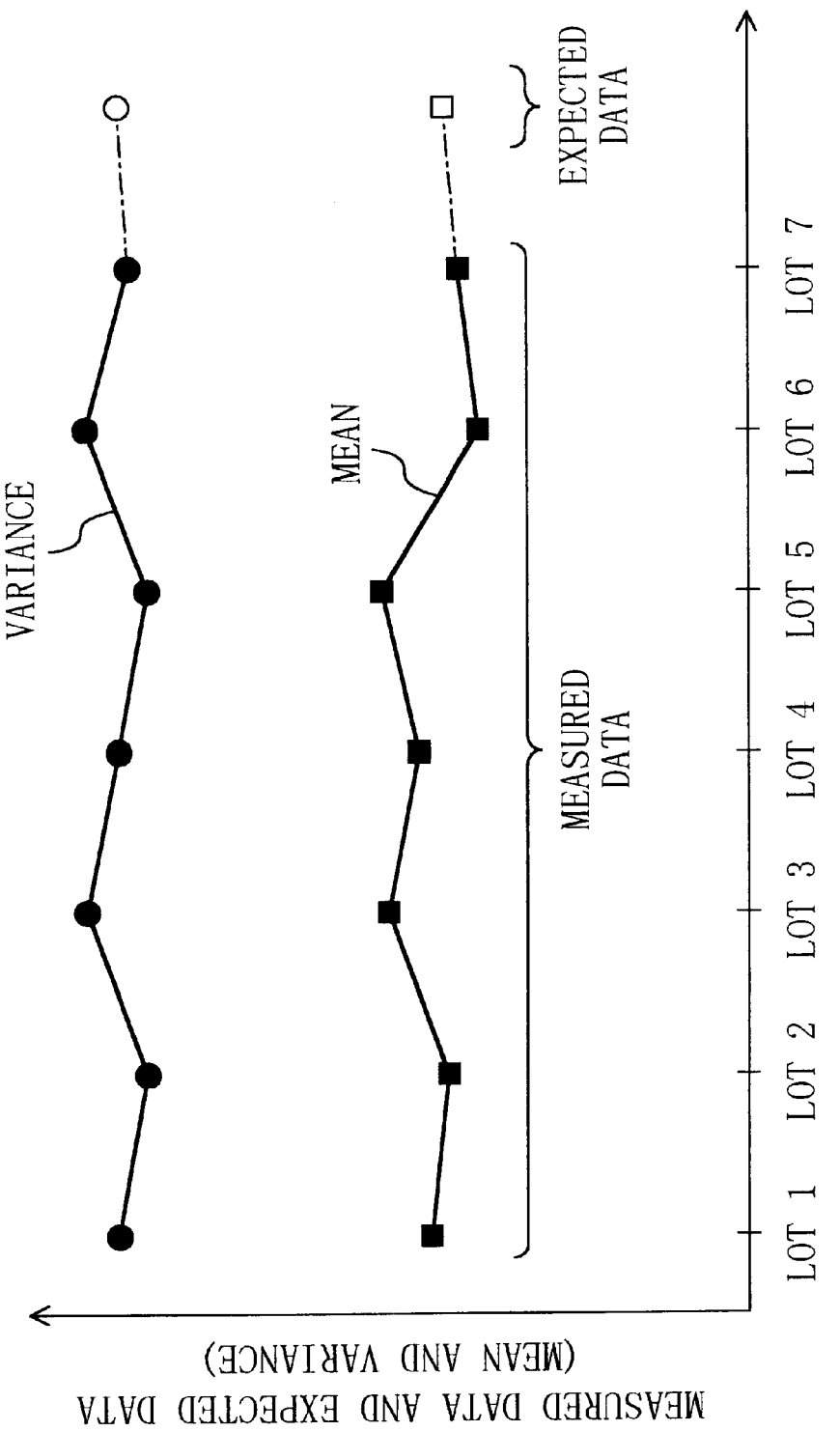
FIG. 4 is a graph illustrating a method for deriving expected data estimatingly obtained at a time a future process step is finished based on the measured data (means and variances) of respective lots processed by a processor in the production line control method of the first embodiment.

FIG. 4 is a graph illustrating a method for deriving expected data (mean and variance), estimatingly obtained at a time a process step, not performed yet but subsequently, is finished, based on the measured data (means and variances) of respective lots processed by a processor. Such a method for obtaining expected data estimatingly derived upon the completion of a subsequent process step based on the measured data of the respective lots processed in the past may be a conventionally known method. For example, a method disclosed in ISSM (International Symposium on Semiconductor Manufacturing, 1996, p. 297) may be used.

Thus, at a point in time the i-th process step on an object to be measured is finished, the production line control apparatus has got measured data (1, 1), ..., (1, M), ..., (i−1, 1), ..., (i−1, M), ..., (i, 1), ..., and (i, M) in the form of a table or in the form of means and variances. The apparatus has also got expected data (i+1, 1), ..., (i+1, M), ..., (N, 1), ... and (N, M) in the form of means and variances. In each of the parentheses of these measured data and expected data, the former numeral denotes the ordinal number of the process step on an object to be measured, while the latter numeral denotes the number of a wafer.

Step of Expecting the Performance of a Final Product

Next, the process step 12 of expecting the performance of a final product based on the measured data and the expected data will be described.

FIG. 5 illustrates a method for expecting the performance of a final product based on the measured data and the expected data of Wafer 1 when all the process steps on the wafer are finished.

As shown in FIG. 5, a performance expectation function A is obtained based on the measured data (1, 1), ..., (i, 1) and the expected data (i+1, 1) ..., (N, 1). The performance expectation function A is generally represented by the following Equation (1):

$$A = f(\text{parameters } 1, 2, \ldots, N) \tag{1}$$

where the parameters 1, 2, ..., N are the measured data or the expected data obtained in the 1st, 2nd, ..., N-th process steps on objects to be measured; the performance expectation function A represents the expected performance of a final product; and f represents a general function.

In the production line of a semiconductor device, typical examples of the parameters 1, 2, ..., N include gate length of a transistor, thickness of an interlevel dielectric and thickness of a metal interconnection, while examples of the performance expectation function A include an operating frequency.

In general, the function f may be represented as a function called "response surface function", which is described in IWSM (International Workshop on Statistical Metrology, p. 8, 1997). A response surface function is often described as a polynomial. For example, Equation (1) may be represented as the following second-order polynomial:

$$A = b_0 + \sum_{i=1}^{N} b_i x_i + \sum_{i=1}^{N} b_{ii} x_i^2 + \sum_{i=1}^{N} \sum_{j=1}^{N} b_{ij} x_j \tag{2}$$

where A represents the performance (such as the operating frequency) of a final product, i.e., individual performance; $b_o$, $b_i$, $b_{ij}$ (where i=1 to N) and $b_{ij}$ (where i=1 to N, and j=1 to N) denote coefficients; and $X_i$ (where i=1 to N) and $X_j$ (where j=1 to N) denote parameters. The respective coefficients $b_o$, $b_i$, $b_{ij}$ and $b_{ij}$ can be obtained by applying a least mean square algorithm or the like to a table prepared beforehand for respective parameters based on simulation or actually measured values.

The table for respective parameters is as follows:

| A(1) | X1(1) | X2(1) | ... | XN(1) |
|---|---|---|---|---|
| A(2) | X1(2) | X2(2) | ... | XN(2) |
| A(3) | X1(3) | X2(3) | ... | XN(3) |

By substituting the measured data (1, 1), ..., (i, 1) and the expected data (i+1, 1), ..., (N, 1) for the respective parameters $X_i$ (where i=1 to N) in Equation (2), the distribution of A can be obtained.

Alternatively, the response surface function represented by Equation (1) may also be expressed by the following Equation (3):

$$A = \alpha_1 \times \beta_1 + \alpha_2 \times \beta_2 + \ldots + \alpha_{12} \times \beta_1 \beta_2 + \alpha_{13} \times \beta_1 \beta_3 + \ldots \tag{3}$$

where A denotes the performance of a final product, i.e., individual performance; $\alpha_1$, $\alpha_2$, $\alpha_{12}$, $\alpha_{13}$ denote coefficients; and $\beta_1$, $\beta_2$ and $\beta_3$ denote parameters (measured data and expected data).

In the first embodiment, the performance of a final product is expected based on measured data derived when a particular process step is finished, measured data derived when another process step was finished prior to the particular process step, and expected data estimatingly derived when still another process step is finished posterior to the particular process step. Alternatively, the performance of a final product may be expected based on only measured data derived when a particular process step is finished. Also, the performance may be expected based on measured data derived when a particular process step is finished and measured data derived when another process step was finished prior to the particular process step.

Step of Calculating the Number of Products Estimatingly Finished

Next, the process step 13 of calculating the number of products estimatingly finished for each performance rank based on the performance of a final product expected in the step 12 of expecting will be described.

Figure 6:
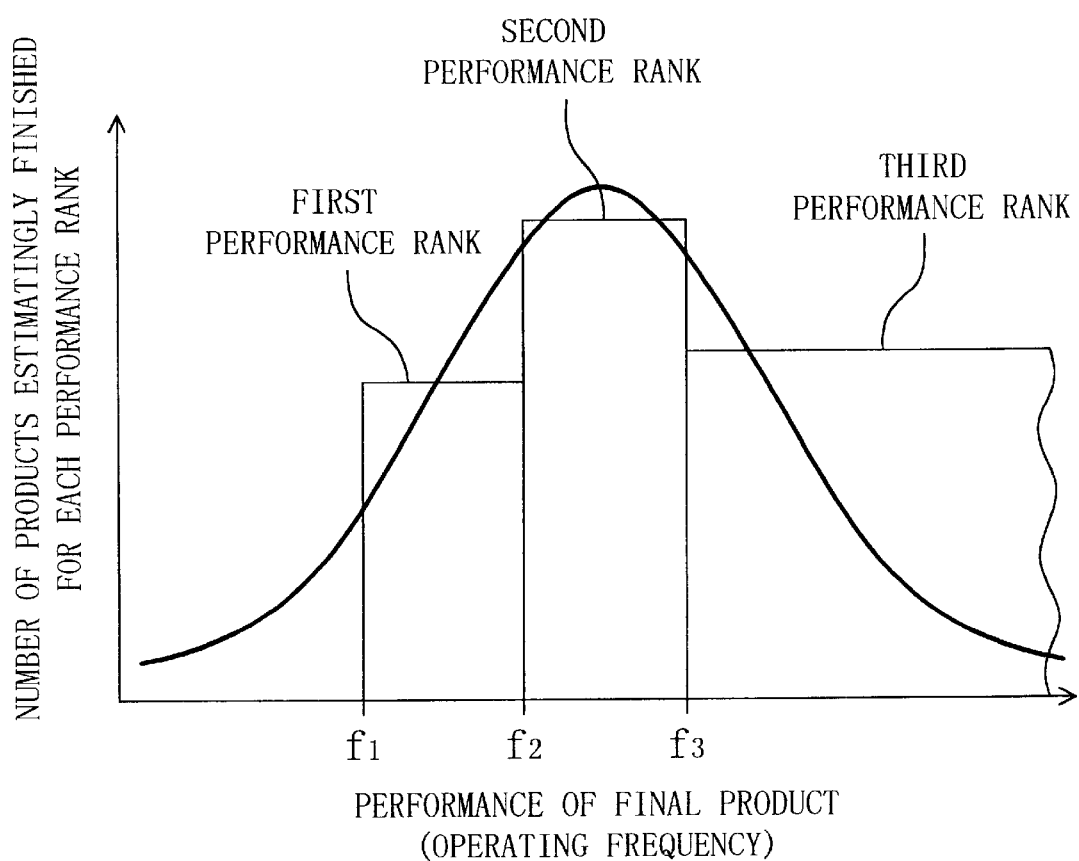
FIG. 6 is a graph illustrating a method for obtaining the number of products estimatingly finished for each performance rank based on the performance (operating frequency) of the final products in the production line control method of the first embodiment.

FIG. 6 is a graph illustrating a method for calculating the number of products estimatingly finished for each performance rank based on the performance (operating frequency f) of the final products. In FIG. 6, products expected to have performance between $f_1$ and $f_2$ when finished are classified under a first performance rank; products expected to have performance between $f_2$ and f3 when finished are classified under a second performance rank; and products expected to have performance superior to $f_3$ when finished are classified under a third performance rank. In this example, the larger the ordinal of the performance rank, the superior the performance is. Also, products, expected to have performance inferior to $f_1$ when finished are below par. In this manner, the number of products estimatingly finished can be expected for each performance rank based on the performance of a final product expected in the step 12 of expecting.

Steps of Expecting a Date on which Processing would be Completed and Deriving the Number of Products Estimatingly Finished for Each Performance Rank by a Due Date Next, a date on which all the process steps would be completed is expected for each product, such as a semiconductor chip or a wafer, or for each lot on which all the process steps are performed simultaneously. A known scheduling method is applicable to the expectation of the date of completion on which all the process steps would be completed. Thus, the detailed description thereof will be omitted herein.

After the date on which processing on each product would be completed has been expected, the number of products estimatingly finished for each performance rank by a due date is derived based on the date of completion and the number of products estimatingly finished for each rank derived in the step 13 of calculating.

Step of Adjusting the Progress of a Production Line

Next, the process step 15 of adjusting the progress of a production line based on the number of products estimatingly finished for each performance rank by a due date will be described.

[First Adjustment Method]

Figure 7:
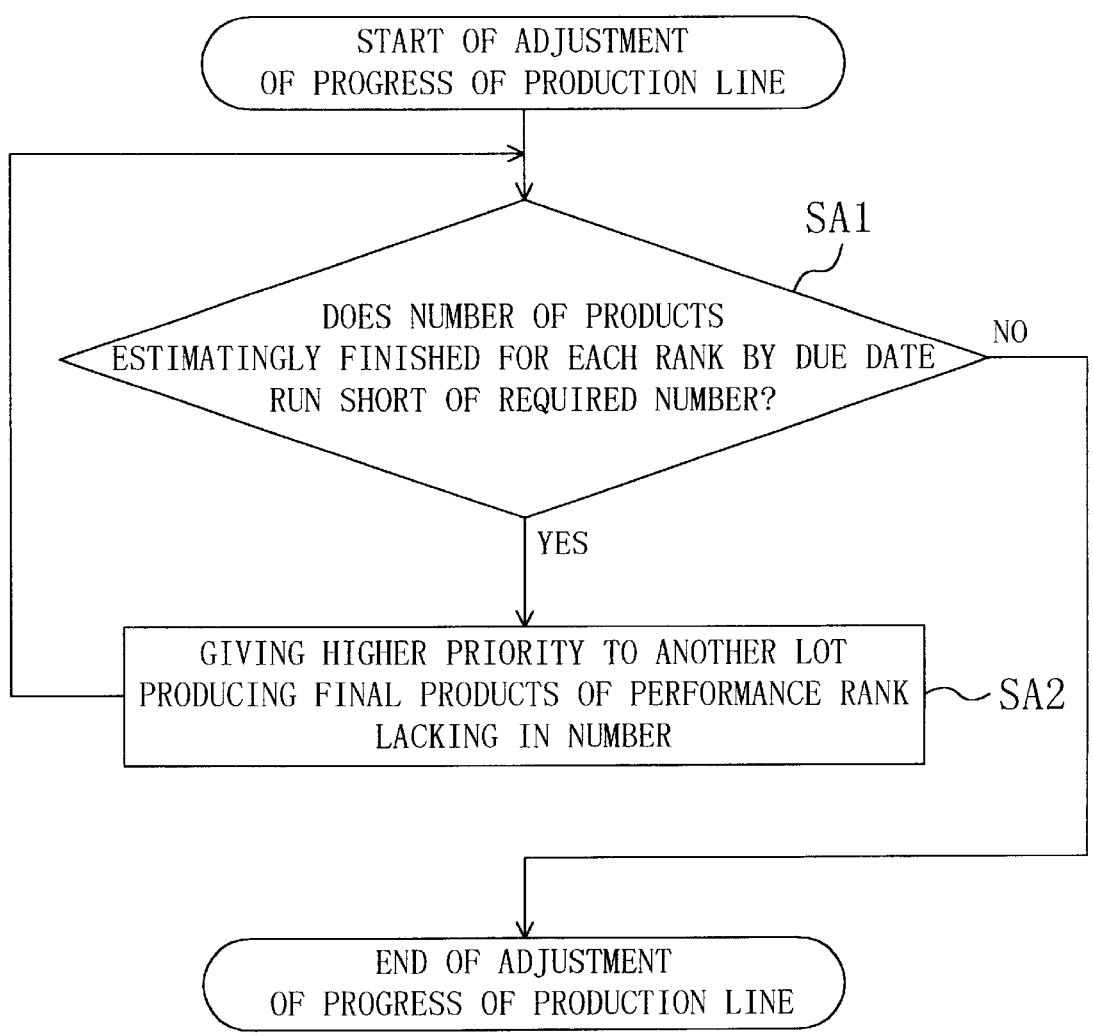
FIG. 7 is a flow chart illustrating a first method for adjusting the progress of a production line in the production line control method of the first embodiment.

Hereinafter, a first method for adjusting the progress of a production line will be described with reference to the flow chart in FIG. 7.

First, in Step SA1, it is determined whether or not the number of products estimatingly finished for each rank by a due date runs short of a required number (i.e., the number of final products required by the due date). If it is determined that the former number does not run short of the latter number, the adjustment of the progress of a production line is not performed and this process step 15 of adjusting the progress is finished. This is because it can be understood that the production line proceeds smoothly.

Alternatively, if it is determined in Step SA1 that the number of products estimatingly finished for each rank by the due date runs short of the required number, it can be understood that the production line does not proceed smoothly. Accordingly, if the production line is allowed to proceed, the number of final products belonging to a particular performance rank would be insufficient when the due date comes. Thus, in Step 5A2, higher priority is given to another lot that can produce final products belonging to the performance rank lacking in number, or a lot that can produce a large number of final products of the performance rank, in particular. Because this lot that can produce final products of the performance rank lacking in number is processed in an earlier order, the number of products estimatingly finished for each rank by the due date reaches its required number.

In accordance with the first adjustment method, in Step 5A2, higher priority is given to another lot that can produce final products of the performance rank lacking in number. Alternatively, products, from which the final products of the performance rank lacking in number could be produced, may be newly put into the production line. Also, the products, from which final products of the performance rank lacking in number could be produced, may be processed on modified conditions in a process step posterior to a particular process step in order to improve the performance of the final products. Furthermore, the products, from which final products of the performance rank lacking in number could be produced, may be processed by a new process step added posterior to a particular process step in order to improve the performance of the final products. Specific methods for modifying processing conditions for a process step or newly adding a process step in such a manner as to improve the performance of a final product will be described in the second embodiment.

[Second Adjustment Method]

Figure 8:
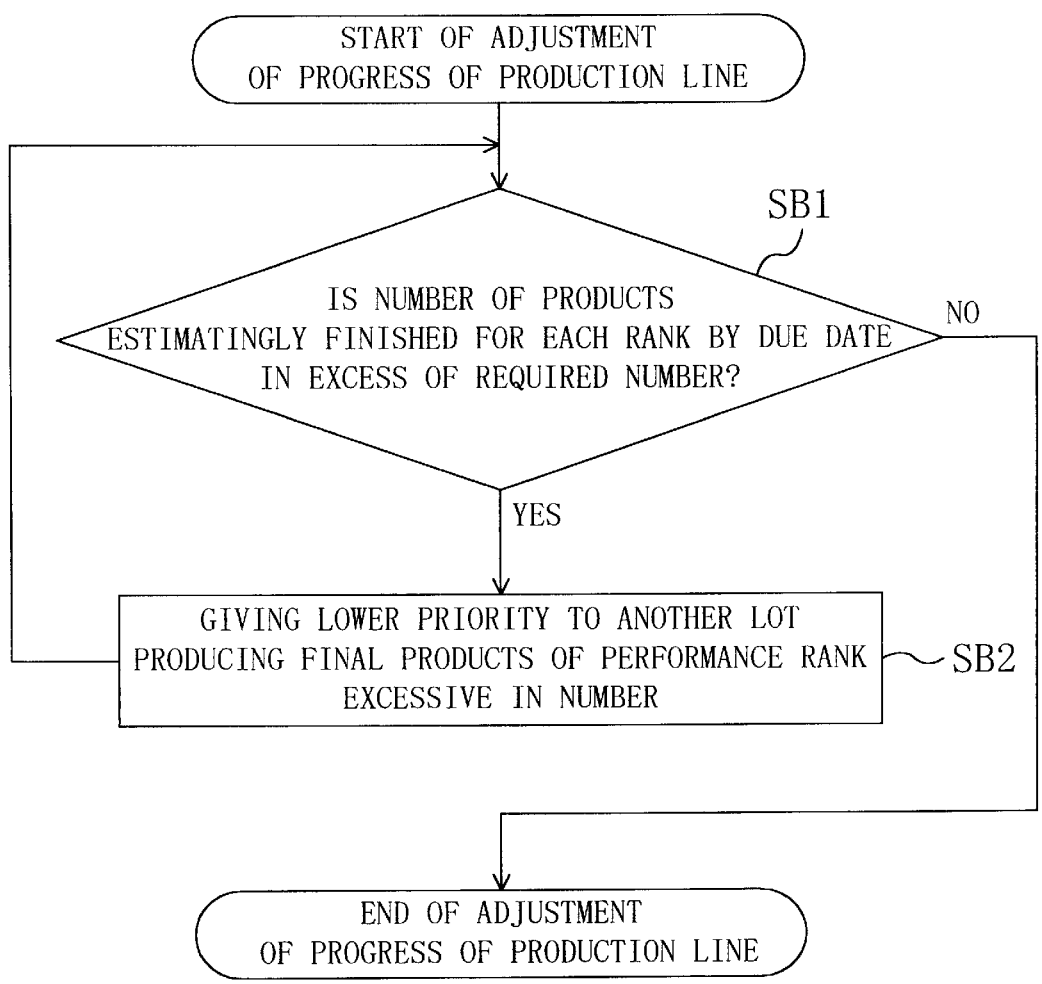
FIG. 8 is a flow chart illustrating a second method for adjusting the progress of a production line in the production line control method of the first embodiment.

Hereinafter, a second method for adjusting the progress of a production line will be described with reference to the flow chart in FIG. 8.

First, in Step SB1, it is determined whether or not the number of products estimatingly finished for each rank by a due date is in excess of a required number (i.e., the number of final products required by the due date). If it is determined that the former number is not in excess of the latter number, the adjustment of the progress of a production line is not performed and this process step 15 of adjusting the progress is finished. This is because it can be understood that the production line proceeds smoothly.

Alternatively, if it is determined in Step SB1 that the number of products estimatingly finished for each rank by a due date is in excess of the required number, it can be understood that the production line does not proceed smoothly. Accordingly, if the production line is allowed to proceed, the number of final products belonging to a particular performance rank would be excessive when the due date comes. Thus, in Step SB2, lower priority is given to another lot that produces final products belonging to the performance rank excessive in number, or, in particular, a lot that produces a large number of final products of the performance rank excessive in number. Because this lot that produces final products of the performance rank excessive in number is processed in a latter order, it is possible to prevent the number of products finished for each rank by the due date from exceeding its required number.

In accordance with the second adjustment method, in Step SB2, lower priority is given to another lot that produces final products of the performance rank excessive in number. Alternatively, the process steps performed on this lot for producing final products of the performance rank excessive in number may be stopped and this lot may be removed from the production line. Also, the process steps to be performed on products, from which the final products of the performance rank excessive in number would be produced, may be omitted. A specific method for omitting the process steps on the products will be described in the second embodiment.

[Third Adjustment Method]

Figure 9:
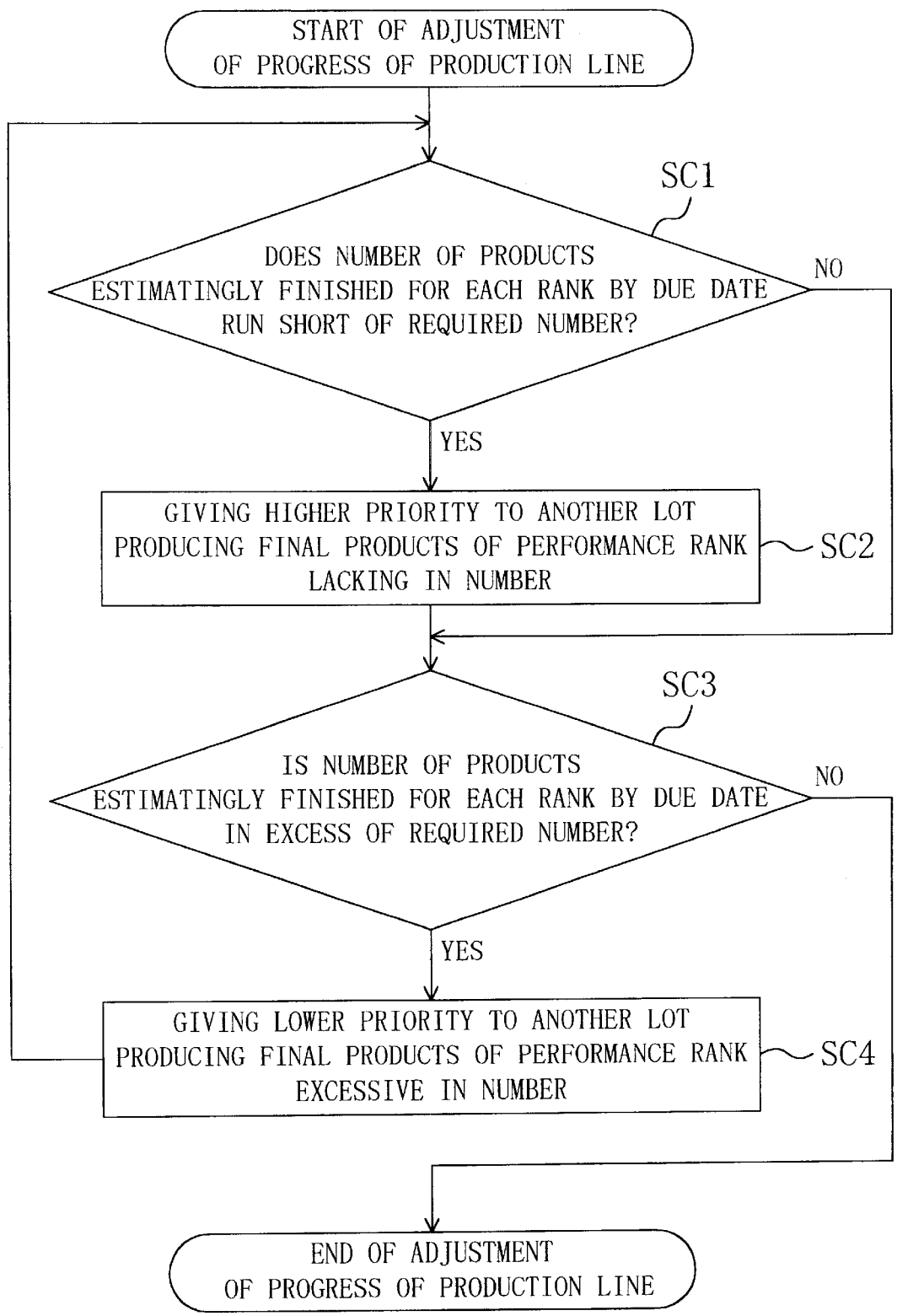
FIG. 9 is a flow chart illustrating a third method for 25 adjusting the progress of a production line in the production line control method of the first embodiment.

Hereinafter, a third method for adjusting the progress of a production line will be described with reference to the flow chart in FIG. 9.

First, in Step SC1, it is determined whether or not the number of products estimatingly finished for each rank by a due date runs short of a required number (i.e., the number of final products required by the due date). If it is determined that the former number does not run short of the latter number, the processing proceeds to Step SC3.

Alternatively, if it is determined in Step SC1 that the number of products estimatingly finished for each rank by the due date runs short of the required number, higher priority is given in Step 5C2 to another lot that can produce final products of the performance rank lacking in number, or, in particular, a lot that can produce a large number of final products of the performance rank. Next, in Step 5C3, it is determined whether or not the number of products estimatingly finished for each rank by the due date is in excess of the required number (i.e., the number of final products required by the due date). If it is determined that the former number is not in excess of the latter number, the adjustment of the progress of a production line is not performed and this process step 15 of adjusting the progress is finished.

Alternatively, if it is determined in Step SC3 that the number of products estimatingly finished for each.rank by the due date is in excess of the required number, lower priority is given in Step SC4 to another lot that produces final products of the performance rank excessive in number, or, in particular, a lot that produces a large number of final products of the pert or mance rank excessive in number.

If these steps SC1 through SC4 are repeatedly performed until the day processing is completed, then the number of products finished for each rank by the due date is neither larger nor smaller than the required number on the day.

[Fourth Adjustment Method]

Hereinafter, a fourth method for adjusting the progress 15 of a production line will be described.

First, the number of products estimatingly finished, the production cost and the selling price are derived for each performance rank. Then, the profit of each lot is derived based on the number of products estimatingly finished, the production cost and the selling price derived.

Next, higher priority is given to a lot for which relatively high profit has been derived, while lower priority is given to a lot for which relatively low profit has been derived.

Then, products belonging to a lot for which relatively high profit has been derived are turned into final products earlier. On the other hand, products belonging to a lot for which relatively low profit has been derived are turned into final products later. As a result, the profitability of the production line can be increased.

[Fifth Adjustment Method]

Hereinafter, a fifth method for adjusting the progress of a production line will be described with reference to FIGS. 10(a) through 10(c). FIG. 10(a) illustrates the numbers of products expectedly obtained from Wafer 1 for respective performance ranks. FIG. 10(b) illustrates the numbers of products expectedly obtained from Wafer i for the respective performance ranks. And FIG. 10(c) illustrates the numbers of products expectedly obtained from Wafer N for the respective performance ranks. In FIGS. 10(a) through 10(c), the first, second and third performance ranks are classified based on a reference value of the performance required for final products. Alternatively, the second and third performance ranks, which are superior to the reference value, are not required to be distinguished from each other.

As can be understood from FIGS. 10(a) through 10(c), in Wafer i, there are a great number of final products belonging to the first performance rank interior to the reference value. Accordingly, Wafer i is eliminated from the production line. In other words, Wafer i is disposed of. Wafer I being eliminated from the production line is based on whether or not the total price of final products obtained from Wafer i is larger than the total processing cost required for the process steps to be performed on Wafer i subsequently. In such a case, the processing cost required subsequently does not exceed the total price of final products in vain.

[Sixth Adjustment Method]

Hereinafter, a sixth method for adjusting the progress of a production line will be described with reference to FIGS. 11(a) through 11(d) and FIGS. 12(a) through 12(d).

Figure 11A:
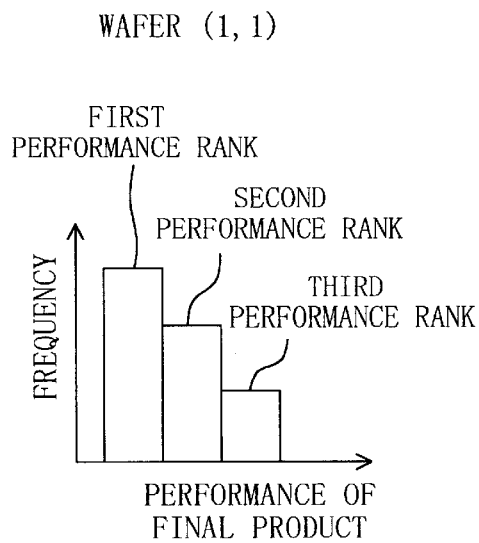
FIGS. 11(a) through 11(d) are graphs illustrating a sixth method for adjusting the progress of a production line in the production line control method of the first embodiment.
Figure 11B:
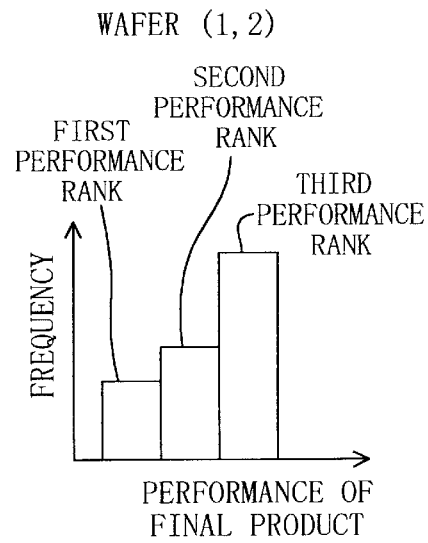
Figure 11C:
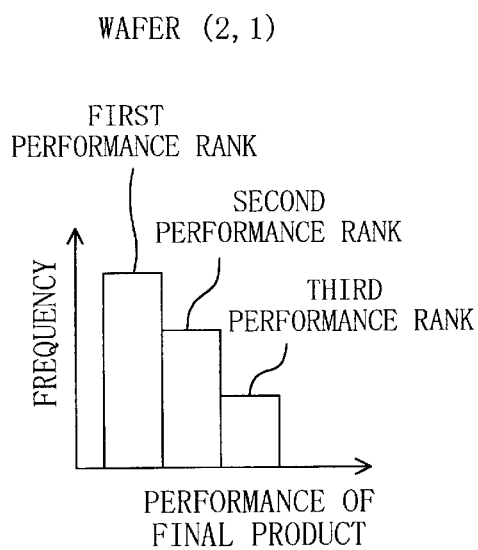
Figure 11D:
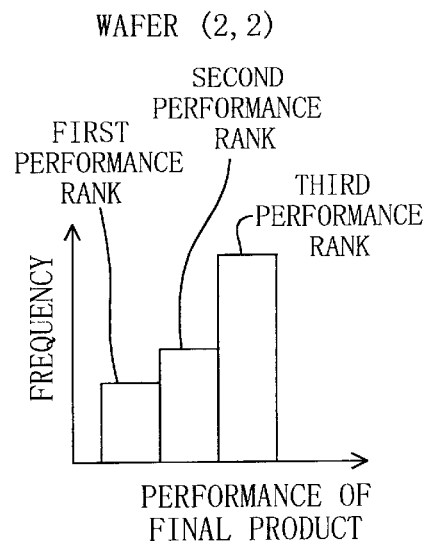

FIG. 11(a) illustrates the distribution of the numbers of products for respective performance ranks, expectedly obtained from the first wafer (1, 1) belonging to the first lot. FIG. 11(b) illustrates the distribution of the numbers of products for respective performance ranks, expectedly obtained from the second wafer (1, 2) belonging to the first lot. FIG. 11(c) illustrates the distribution of the numbers of products for respective performance ranks, expectedly obtained from the first wafer (2,1) belonging to the second lot. And FIG. 11(d) illustrates the distribution of the numbers of products for respective performance ranks, expectedly obtained from the second wafer (2, 2) belonging to the second lot.

As can be understood from FIGS. 11(a) through 11(d), the first wafer (1, 1) belonging to the first lot and the first wafer (2, 1) belonging to the second lot have a similar distribution of the numbers of products estimatingly finished for respective performance ranks. In the same way, the second wafer (1, 2) belonging to the first lot and the second wafer (2, 2) belonging to the second lot also have a similar distribution of the numbers of products estimatingly finished for respective performance ranks. Accordingly, adjustments are performed in such a manner as to transfer the second wafer (1,2) belonging to the first lot from the first lot to the second lot, and the first wafer (2, 1) belonging to the second lot from the second lot to the first lot.

Figure 12A:
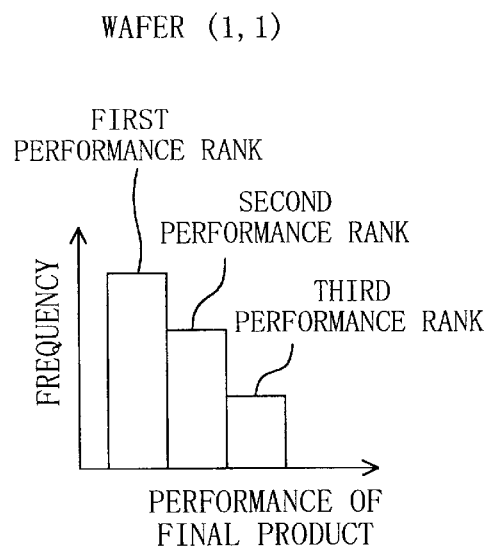
FIGS. 12(a) through 12(d) are graphs illustrating the sixth method for adjusting the progress of a production line in the production line control method of the first embodiment.
Figure 12B:
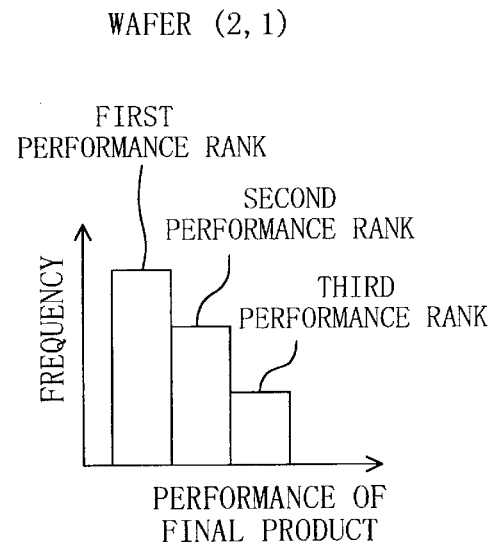
Figure 12C:
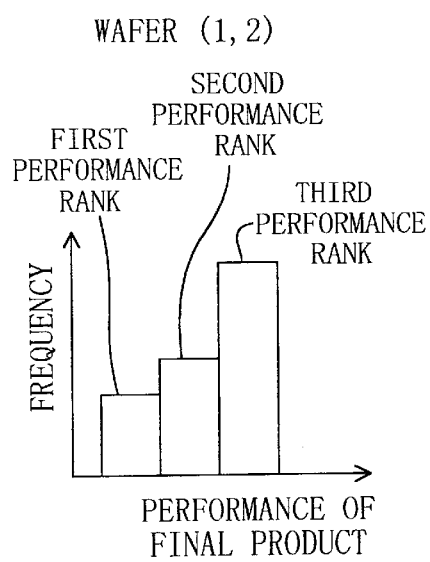
Figure 12D:
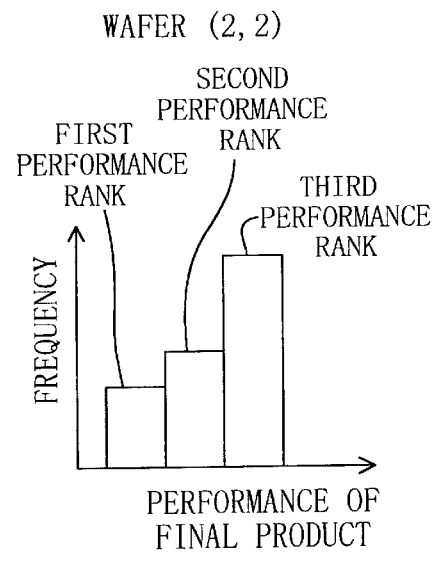

FIG. 12(a) illustrates the distribution of the numbers 15 of products for the respective performance ranks, expectedly obtained from the first wafer (1, 1) belonging to the first lot after the adjustment has been performed. FIG. 12(b) illustrates the distribution of the numbers of products for the respective performance ranks, expectedly obtained from the second wafer (2, 1) belonging to the first lot[, for the respective performance ranks] after the adjustment has been performed. FIG. 12(c) illustrates the distribution of the numbers of products for the respective performance ranks, expectedly obtained from the first wafer (1, 2) belonging to the second lot after the adjustment has been performed. And FIG. 12(d) illustrates the distribution of the numbers of products for the respective performance ranks, expectedly obtained from the second wafer (2, 2) belonging to the second lot after the adjustment has been performed. As can be understood from FIGS. 12(a) through 12(d), the first and second wafers (1, 1) and (2, 1) belonging to the first lot have a similar distribution of the numbers of products estimatingly finished for the respective performance ranks after the adjustment has been performed. In the same way, the first and second wafers (1, 2) and (2, 2) belonging to the second lot have a similar distribution of the numbers of products estimatingly finished for the respective performance ranks after the adjustment has been performed.

If the wafers were not transferred between the lots, the total number of products estimatingly finished belonging to a relatively low performance rank would not be greatly different from the total number of products estimatingly finished belonging to a relatively high performance rank in both the first and second lots. Accordingly, even after all the process steps on the first and second lots are completed, the total number of final products belonging to a relatively low performance rank would not be greatly different from the total number of final products belonging to a relatively high performance rank.

By contrast, if the wafers are transferred between the lots as is done in this sixth adjustment method, the total number of final products belonging to a relatively low performance rank increases when all the process steps on the first lot are finished. And the total number of final products belonging to a relatively high performance rank increases when all the process steps on the second lot are finished. Thus, if it is preferable to increase the total number of final products belonging to a relatively low performance rank, then higher priority may be given to the first lot. Conversely, if it is preferable to increase the total number of final products belonging to a relatively high performance rank, then higher priority may be given to the second lot. Accordingly, even if the needs on the market change during performing a large number of process steps in a production line, a required number of products in the highest demand can be supplied at an appropriate time.

Assume a production line control program implementing the foregoing production line control method of the first embodiment is drawn up and stored in a computer readable storage medium, and the storage medium is inserted into the auxiliary storage of a computer. Then, the production line control program of the first embodiment is loaded into the main storage of the computer. And when a predetermined operation time comes (i.e., a predetermined event occurs), the predetermined functions of the respective procedures are executed by the CPU of the computer.

Embodiment 2

Hereinafter, a method and apparatus for controlling a production line, and a computer readable storage medium in which a production line control program is stored in the second embodiment of the present invention will be described with reference to FIGS. 13 through 18(f).

Figure 13:
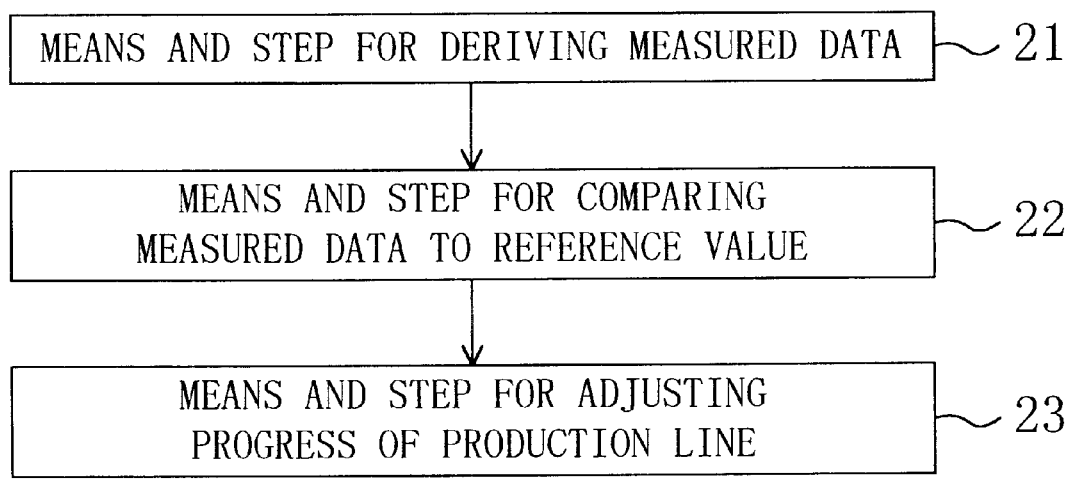
FIG. 13 is a conceptual diagram illustrating the flow of the method and apparatus for controlling a production line in the second embodiment of the present invention.

FIG. 13 is a conceptual diagram illustrating the flow of method and apparatus for controlling a production line of the second embodiment. As shown in FIG. 13, the production line control method and apparatus of the second embodiment includes: a means and step 21 for deriving measured data; a means and step 22 for comparing the measured data to a reference value; and a means and step 23 for adjusting the progress of a production line. These means and steps 21 through 23 are implemented as respective procedures for a production line control program, which are stored in a computer readable storage medium and executed by a computer.

Step of Deriving Measured Data

First, when a particular one of a plurality of process steps is finished, measured data is derived by the means 21 for measuring the characteristics of at least one product belonging to a particular lot on which the particular process step has been performed (hereinafter, such a product will be called a "particular product"). This process step 21 of deriving measured data is fundamentally the same as the process step 11 of deriving measured data and expected data as described in the first embodiment. Thus, the description thereof will be omitted herein.

Step of Comparing Measured Data to a Reference Value

Next, the measured data of the particular product derived in the step 21 of deriving is compared by the means 22 to a reference value of the characteristics required for the particular product when the particular process step is finished.

Step of Adjusting the Progress of a Production Line

Next, the process step 23 of adjusting the progress of a production line based on the number of products estimatingly finished for each rank by a due date will be described.

[First Adjustment Method]

Hereinafter, a first adjustment method will be specifically described with reference to FIGS. 14(a) through 14(e), FIGS. 15(a) through 15(f) and FIGS. 16(a) and 16(b). In accordance with the first adjustment method, if measured data is inferior to a reference value, a new process step is added posterior to a particular process step so as to improve the performance of a final product.

First, a method for forming a gate electrode will be described with reference to FIGS. 14(a) through 14(e), in which the first adjustment method is not performed.

Figure 14A:
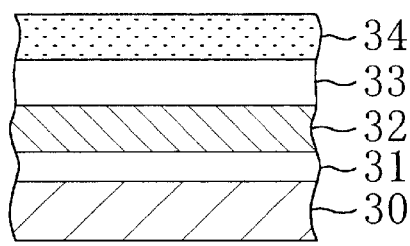
FIGS. 14(a) through 14(e) are cross-sectional views illustrating a first method for adjusting the progress of a production line in the production line control method of the second embodiment.
Figure 14D:
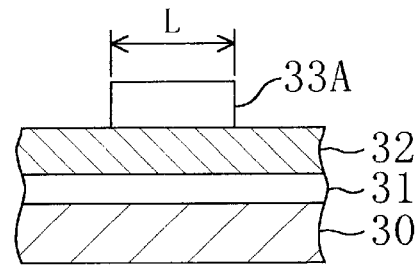
Figure 14B:
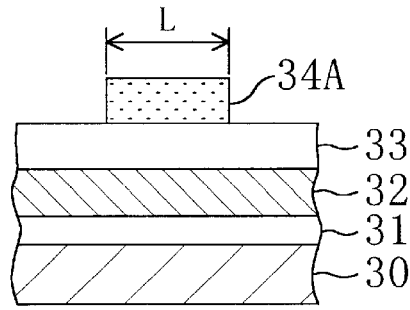

As shown in FIG. 14(a), a gate oxide film 31, a polysilicon film 32 to be a gate electrode, an antireflection film 33 and a resist film 34 are stacked in this order on a silicon substrate 30. Thereafter, as shown in FIG. 14(b), the resist film 34 is patterned by photolithography to form a resist pattern 34A having a pattern width L.

Figure 14E:
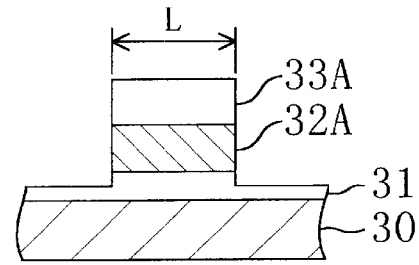
Figure 14C:
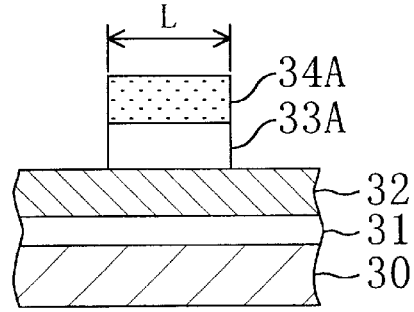

Then, as shown in FIG. 14(c), the antireflection film 33 is etched using the resist pattern 34A as a mask, thereby forming a patterned antireflection film 33A having the pattern width L. And, as shown in FIG. 14(d), the resist pattern 34A is removed.

Subsequently, as shown in FIG. 14(e), the poly-silicon film 32 is etched using the patterned antireflection film 33A as a mask, thereby forming a gate electrode 32A having a gate length L. In this process step, the gate oxide film 31 functions as an etching stopper. In the step of forming the gate electrode 32A, the gate length L is an important parameter. A current value representing the performance of a transistor is inversely proportional to the gate length L. Accordingly, the size of the gate length L affects the magnitude of the current value.

Next, another method for forming a gate electrode will be described with reference to FIGS. 15(a) through 15(f), in which the first adjustment method is performed.

Figure 15A:
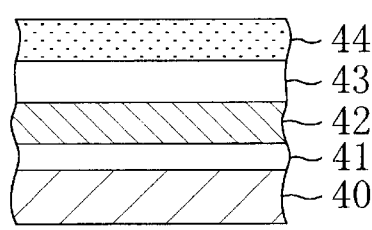
FIGS. 15(a) through 15(f) are cross-sectional views illustrating the first method for adjusting the progress of a production line in the production line control method of the second embodiment.
Figure 15B:
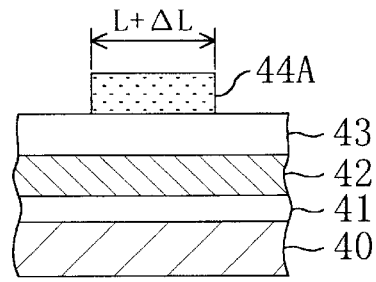

As shown in FIG. 15(a), a gate oxide film 41, a poly-silicon film 42 to be a gate electrode, an antireflection film 43 and a resist film 44 are stacked in this order on a silicon substrate 40. Thereafter, as shown in FIG. 15(b), the resist film 44 is patterned by photolithography to form a resist pattern 44A having a pattern width L+ΔL. It is noted that the pattern width of the resist pattern 44A has become longer than the target value L by ΔL because of various factors during a process.

Figure 15C:
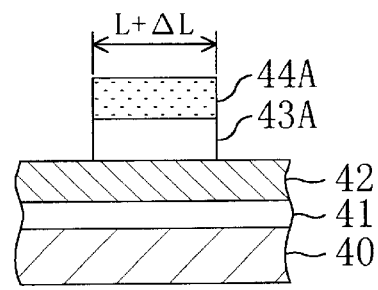
Figure 15D:
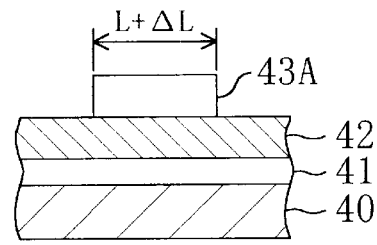

Subsequently, as shown in FIG. 15(c), the antireflection film 43 is etched using the resist pattern 44A as a mask, thereby forming a patterned antireflection film 43A having the pattern width L+ΔL. And, as shown in FIG. 15(d), the resist pattern 44A is removed.

Figure 15E:
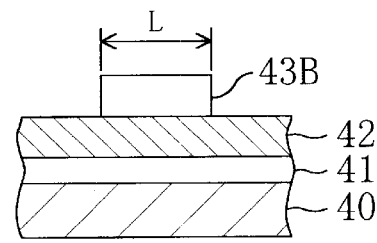

Then, as shown in FIG. 15(e), the patterned anti-reflection film 43A is ashed isotropically, thereby forming a modified antireflection film 43B having a pattern width L.

Figure 15F:
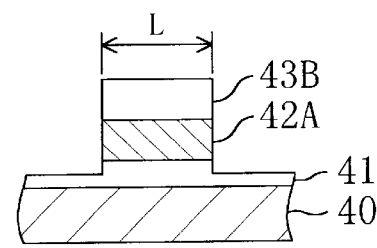

Finally, as shown in FIG. 15(f), the poly-silicon film 42 is etched using the modified antireflection film 43B as a mask, thereby forming a gate electrode 42A having a gate length L. In this process step, the gate oxide film 41 functions as an etching stopper.

The first adjustment method is characterized by the addition of a modification process step of isotropically ashing the patterned antireflection film 43A, because the pattern width of the patterned antireflection film 43A is L+ΔL, which is larger than the target value L by ΔL. As a result, the pattern width of the patterned antireflection film 43A can be modified into the target value L.

Figure 16A:
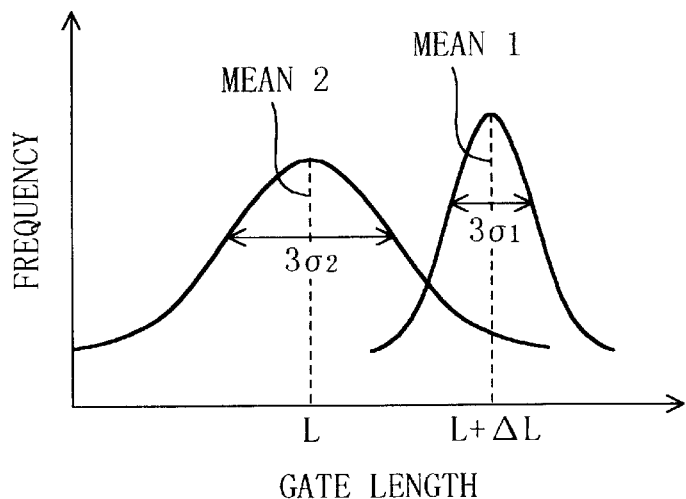
FIGS. 16(a) and 16(b) are graphs illustrating the first method for adjusting the progress of a production line in the production line control method of the second embodiment.
Figure 16B:
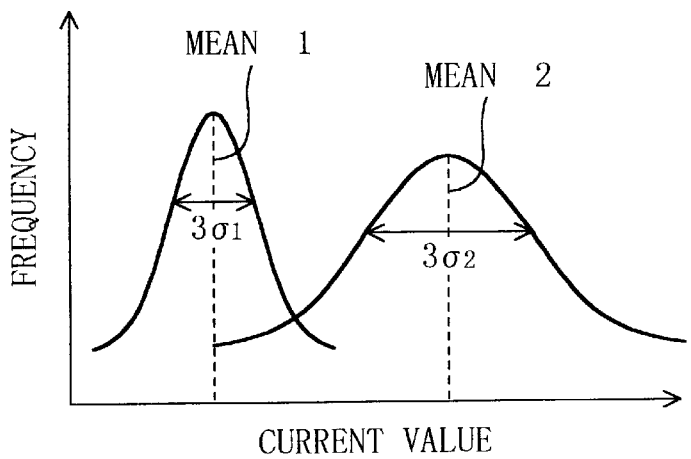

FIG. 16(a) illustrates the means and variances of a gate length before and after the modification process step is performed, while FIG. 16(b) illustrates the means and variances of a current value before and after the modification process step is performed. As for both the gate length and the current value, $3\sigma_1$ represents a variance before the modification process step is performed, and $3\sigma_2$ represents a variance after the modification process step has been performed.

As can be understood from FIGS. 16(a) and 16(b), if the modification process step is additionally performed, then the gate length is shortened and the current value increases advantageously. However, the variances $3\sigma_2$ of the gate length and the current value also increase disadvantageously.

For example, the modification process step may be additionally performed when the gate length, one of measured data, exceeds a reference value or when the performance of a final product does not meet a predetermined standard. The former criterion is suitable for a case where a unique standard is applied to the performance of final products. On the other hand, the latter criterion is suitable for a case where diverse standards are applied to the performance of final products. In determining whether or not the performance of a final product would meet a predetermined reference, the performance of a final product is preferably expected based on not only measured data derived when a particular process step is finished, but also measured data derived when another process step preceding the particular process step was finished and expected data estimatingly obtained when still another process step succeeding the particular process step is finished.

[Second Adjustment Method]

Hereinafter, a second adjustment method will be specifically described with reference to FIGS. 17(a) through 17(f) and FIGS. 18(a) and 18(f). In accordance with the second adjustment method, if measured data is inferior to a reference value, the processing conditions for at least one process step to be performed posterior to a particular process step are modified in such a manner as improving the performance of a final product.

In general, a gate electrode is formed in accordance with the method illustrated in FIGS. 14(a) through 14(e). However, the shorter the gate length, the more varied the pattern widths of resist patterns will become. Thus, in accordance with a suggested method disclosed in 1996 Symposium on VLSI Technology Digest of Technical Papers, pp. 216–217, the pattern width of a resist pattern is set larger than a target value L by α beforehand, and is modified into the target value L by performing an ashing process step subsequently. Hereinafter, a method for forming a gate electrode, including this modification process step, will be described with reference to FIGS. 17(a) through 17(f), in which the second adjustment method is not performed.

Figure 17A:
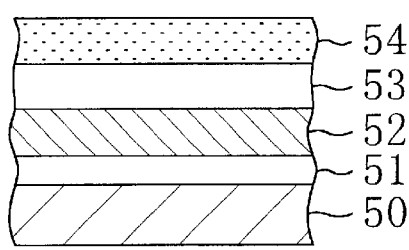
FIGS. 17(a) through 17(f) are cross-sectional views illustrating a second method for adjusting the progress of a production line in the production line control method of the second embodiment.
Figure 17B:
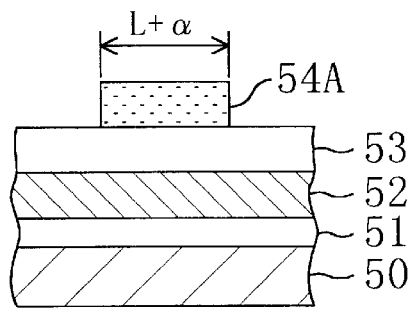

As shown in FIG. 17(a), a gate oxide film 51, a poly-silicon film 52 to be a gate electrode, an antireflection film 53 and a resist film 54 are stacked in this order on a silicon substrate 50. Thereafter, as shown in FIG. 17(b), the resist film 54 is patterned by photolithography, to form a resist pattern 54A having a pattern width L+α, which is larger than the target value L by α.

Figure 17C:
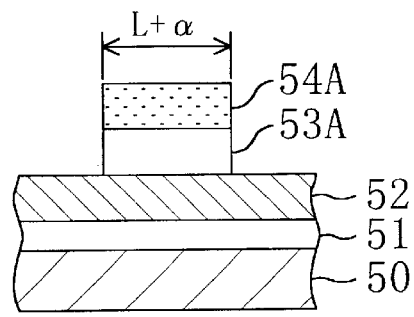
Figure 17D:
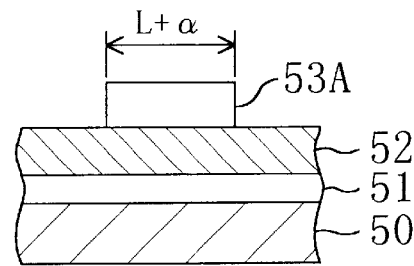

Subsequently, as shown in FIG. 17(c), the antireflection film 53 is etched using the resist pattern 54A as a mask, thereby forming a patterned antireflection film 53A having the pattern width L+α. And, as shown in FIG. 17(d), the resist pattern 54A is removed.

Figure 17E:
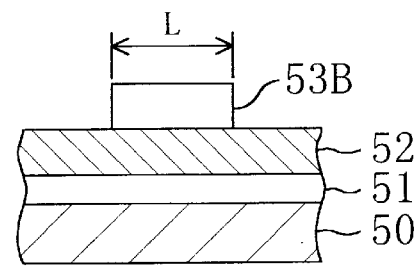

Then, as shown in FIG. 17(e), the patterned antireflection film 53A is ashed isotropically, thereby forming a modified antireflection film 53B having a pattern width L.

Figure 17F:
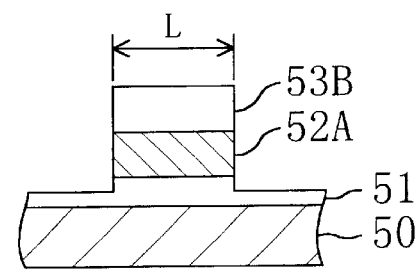

Finally, as shown in FIG. 17(f), the poly-silicon film 52 is etched using the modified antireflection film 53B as a mask, thereby forming a gate electrode 52A having a gate length L. In this process step, the gate oxide film 51 functions as an etching stopper.

Next, another method for forming a gate electrode will be described with reference to FIGS. 18(a) through 18(f), in which the second adjustment method is performed.

Figure 18A:
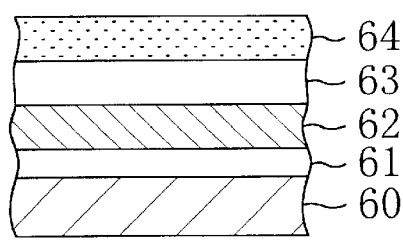
FIGS. 18(a) through 18(f) are cross-sectional views illustrating the second method for adjusting the progress of a production line in the production line control method of the second embodiment.
Figure 18B:
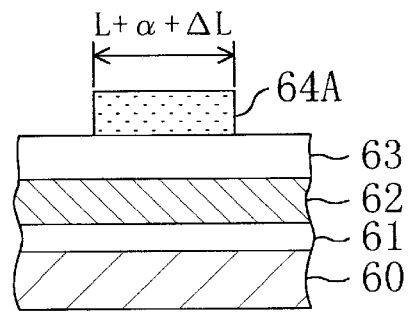

As shown in FIG. 18(a), a gate oxide film 61, a poly-silicon film 62 to be a gate electrode, an antireflection film 63 and a resist film 64 are stacked in this order on a silicon substrate 60. Thereafter, as shown in FIG. 18(b), the resist film 64 is patterned by photolithography to form a resist pattern 64A having a pattern width L+α+ΔL. It is noted that the pattern width of the resist pattern 64A has become longer than the target value L+α by ΔL because of various factors during a process.

Figure 18C:
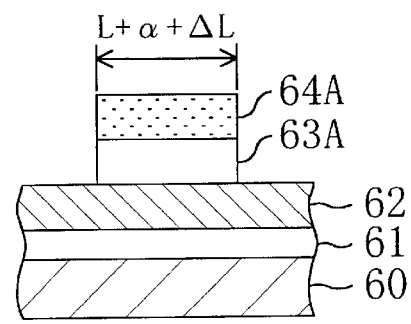
Figure 18D:
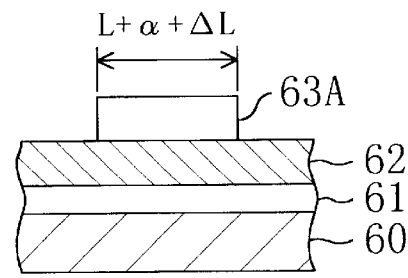

Then, as shown in FIG. 18(c), the antireflection film 63 is etched using the resist pattern 64A as a mask, thereby forming a patterned antireflection film 63A having a pattern width L+α+ΔL. And, as shown in FIG. 18(d), the resist pattern 64A is removed.

Figure 18E:
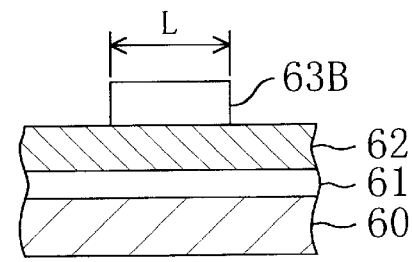

Subsequently, as shown in FIG. 18(e), the patterned antireflection film 63A is ashed isotropically, thereby forming a modified antireflection film 63B having a pattern width L. In this modification process step, the ashing parameters in the initially set conditions for modifying the pattern width L+α into L are changed into the parameters in the conditions for modifying the pattern width L+α+ΔL into L.

Figure 18F:
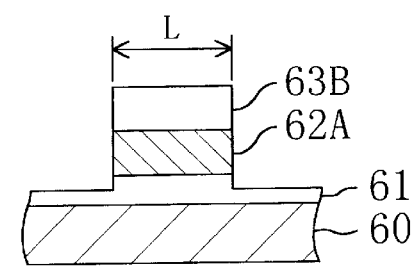

Finally, as shown in FIG. 18(f), the poly-silicon film 62 is etched using the modified antireflection film 63B as a mask, thereby forming a gate electrode 62A having a gate length L. In this process step, the gate oxide film 61 functions as an etching stopper.

The second adjustment method is characterized in that the parameters of the modification process step of isotropically ashing the patterned antireflection film 63A are changed, because the pattern width of the patterned antireflection film 63A is L+α+ΔL, which is larger than the target value L+α by ΔL. As a result, the pattern width of the patterned anti-reflection film 63A can be modified into the target value L.

For example, the parameters of the modification process step may be changed when the gate length, one of measured data, exceeds a reference value or when the performance of a final product does not meet a predetermined standard. The former criterion is suitable for a case where a unique standard is applied to the performance of final products. On the other hand, the latter criterion is suitable for a case where diverse standards are applied to the performance of final products. In determining whether or not the performance of a final product would meet a predetermined reference, the performance of a final product is preferably expected based on not only measured data derived when a particular process step is finished, but also measured data derived when another process step, preceding the particular process step, was finished and expected data estimatingly obtained when still another process step, succeeding the particular process step, is finished.

[Third Adjustment Method]

Hereinafter, a third adjustment method will be described. In accordance with the third adjustment method, if measured data is inferior (or superior) to a reference value, at least one process step to be performed posterior to a particular process step is omitted.

The third adjustment method is applicable in the following manner to the method for forming a gate electrode shown in FIGS. 18(a) through 18(f), in which the second adjustment method is performed. Specifically, if the pattern width of the resist pattern 64A happens to be L because of various factors in a process during which the resist pattern 64A, which should have a pattern width of L+α+ΔL, is formed by patterning of the resist film 64 by photolithography, then the modification process step, to be performed subsequently for forming a modified antireflection film 63B by ashing the patterned antireflection film 63A isotropically is omitted.

In such a case, the number of process steps can be reduced without deteriorating the performance rank of a final product.

Assume a production line control program, implementing the foregoing production line control method of the second embodiment, is drawn up and stored in a computer readable storage medium, and the storage medium is inserted into the auxiliary storage of a computer. Then, the production line control program of the second embodiment is loaded into the main storage of the computer. And when a predetermined operation time comes (i.e., a predetermined event occurs), the predetermined functions of the respective procedures are executed by the CPU of the computer.

What is claimed is:

1. A method for controlling a production line, in which a final product is obtained by performing a plurality of process steps on each of a plurality of products included in a lot, the method comprising the steps of:

obtaining measured data by measuring the characteristic of each of the plurality of products included in the lot at a time when one of the plurality of the process steps performed on each of the plurality of products is finished;

expecting the performance of a final product of each of the plurality of products based on the measured data; and ranking the final product of each of the plurality of products based on the expected performance of the final product, and thereby calculating a number for the final product of each ranking.

2. The method of claim 1, wherein the step of expecting comprises the step of expecting the performance of the final product based on measured data obtained at a time when another one of the process steps performed prior to the particular process step was finished and the measured data obtained at the time the particular process step is finished.

3. The method of claim 1, wherein the step of expecting comprises the step of expecting the performance of the final product based on measured data obtained at a time when another one of the process steps performed prior to the particular process step was finished, the measured data obtained at the time the particular process step is finished, and expected data estimatingly obtained at a time when another one of the process steps to be performed posterior to the particular process step, is finished.

4. The method of claim 1, wherein the plurality of process steps are performed on each of a plurality of lots, wherein the plurality of products separately belong to the respective lots, the method further comprising the steps of:
      expecting a date of completion, on which all of the process steps on the products, belonging to one of the lots, would be completed;
      obtaining a second number of products estimatingly finished for each said performance rank by a due date, said step of obtaining a second number being based on the date of completion and the first number; and
      if the second number runs short of a required number, performing at a higher rate the process steps on another one of the lots which produces final products of the same performance rank as the products estimatingly finished by the due date.

5. The method of claim 1, further comprising the steps of:
   expecting a date of completion on which all of the process steps on at least one of the products would be completed;
   obtaining a second number of products, estimatingly finished for each said performance rank by a due date, based on the date of completion and the first number; and
   if the second number runs short of a required number, introducing products into the production line to produce final products of the same performance rank as the products estimatingly finished by the due date.

6. The method of claim 1, further comprising the steps of:
   expecting a date of completion on which all of the process steps on at least one of the products would be completed;
   obtaining a second number of products estimatingly finished for each said performance rank by a due date, said step of obtaining a second number being based on the date of completion and the first number; and
   if the second number runs short of a required number, modifying processing conditions for the process steps to be performed on the at least one product posterior to the particular process step such that the performance of the final product is improved.

7. The method of claim 1, further comprising the steps of:
   expecting a date of completion on which all of the process steps on at least one of the products would be completed;
   obtaining a second number of products estimatingly finished for each said performance rank by a due date, said step of obtaining a second number being based on the date of completion and the first number; and
   if the second number runs short of a required number, additionally performing a new process step on the at least one product posterior to the particular process step, said new process step being performed such that the performance of the final product is improved.

8. The method of claim 1, wherein the plurality of process steps are performed on each of a plurality of lots, wherein the plurality of products separately belong to the respective lots, the method further comprising the steps of:
   expecting a date of completion during which all of the process steps on the products belonging to one of the lots are completed;
   obtaining a second number of products estimatingly finished for each said performance rank by a due date, said step of obtaining a second number being based on the date of completion and the first number; and
   if the second number is in excess of a required number, performing at a lower rate the process steps on another one of the lots which produces final products of the same performance rank as the products estimatingly finished by the due date.

9. The method of claim 1, wherein the plurality of process steps are performed on each of a plurality of lots, wherein the plurality of products separately belong to the respective lots,
   the method further comprising the steps of:
      expecting a date of completion during which all of the process steps on the products belonging to one of the lots are completed;
      obtaining a second number of products estimatingly finished for each said performance rank by a due date, said step of obtaining a second number being based on the date of completion and the first number; and
      if the second number is in excess of a required number, stopping the process steps on another one of the lots which produces final products of the same performance rank as the final products estimatingly finished by the due date.

10. The method of claim 1, further comprising the steps of:
    expecting a date of completion on which all of the process steps on at least one of the products would be completed;
    obtaining a second number of product estimatingly finished for each said performance rank by a due date, said step of obtaining a second number being based on the date of completion and the first number; and
    if the second number is in excess of a required number, omitting at least one of the process steps performed posterior to the particular process step.

11. The method of claim 1, wherein the plurality of process steps are performed on each of a plurality of lots, wherein the plurality of products separately belong to the respective lots,
    the method further comprising the steps of:
        obtaining an estimated profit to be procured by each said lot based on the number of products estimatingly finished, production costs and selling price for each said performance rank of the final products; and
        performing at a higher rate the process steps on the products belonging to a lot for which the profit obtained is relatively high.

12. The method of claim 1, further comprising the steps of:
    determining whether or not the performance of the final product expected in the step of expecting meets a predetermined standard; and
    removing products from the production line of which the final products are determined as not meeting the predetermined standard.

13. The method of claim 1, wherein the plurality of process steps are performed on each of a plurality of lots, wherein the plurality of products separately belong to the respective lots,
    the method further comprising the step of transferring products from one lot to another lot to which other products belong, the final products of which are of approximately the same performance rank as that of the performance expected in the step of expecting.

* * * * *

UNITED STATES PATENT AND TRADEMARK OFFICE
CERTIFICATE OF CORRECTION

PATENT NO. : 6,594,598 B1
DATED : July 15, 2003
INVENTOR(S) : Hiroaki Ishizuka et al.

It is certified that error appears in the above-identified patent and that said Letters Patent is hereby corrected as shown below:

<u>Title page,</u>
Item [73], Assignee, delete "Matsushita Electronics Corporation"
and add -- Matsushita Electric Industrial Co., Ltd. --

Signed and Sealed this

Fifteenth Day of June, 2004

JON W. DUDAS
*Acting Director of the United States Patent and Trademark Office*